United States Patent
Yoshida et al.

(10) Patent No.: US 9,611,772 B2
(45) Date of Patent: Apr. 4, 2017

(54) ABNORMALITY DETECTION SYSTEM OF INTERNAL COMBUSTION ENGINE

(71) Applicants: Kohei Yoshida, Gotenba (JP); Toshihiro Mori, Gotenba (JP); Ryohei Oono, Susono (JP)

(72) Inventors: Kohei Yoshida, Gotenba (JP); Toshihiro Mori, Gotenba (JP); Ryohei Oono, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/763,215

(22) PCT Filed: Jan. 31, 2013

(86) PCT No.: PCT/JP2013/052240
§ 371 (c)(1),
(2) Date: Jul. 24, 2015

(87) PCT Pub. No.: WO2014/118951
PCT Pub. Date: Aug. 7, 2014

(65) Prior Publication Data
US 2015/0361844 A1      Dec. 17, 2015

(51) Int. Cl.
*F01N 11/00* (2006.01)
*F01N 3/08* (2006.01)
(Continued)

(52) U.S. Cl.
CPC ......... *F01N 3/0871* (2013.01); *F01N 3/0814* (2013.01); *F01N 3/0842* (2013.01);
(Continued)

(58) Field of Classification Search
CPC .. F01N 11/002; F01N 11/007; F01N 2250/02; F01N 2560/025; F02D 41/027; F02D 41/0275
See application file for complete search history.

(56) References Cited

FOREIGN PATENT DOCUMENTS

| EP | 1 555 401 A1 | 7/2005 |
|---|---|---|
| JP | 2004-308451 | 11/2004 |

(Continued)

OTHER PUBLICATIONS

Machine translation of JP2006177311A, accessed on Aug. 5, 2016.*

*Primary Examiner* — Jonathan Matthias
(74) *Attorney, Agent, or Firm* — Finnegan, Henderson, Farabow, Garrett & Dunner, LLP

(57) ABSTRACT

A straight-flow exhaust purification catalyst (13) and a hydrocarbon supply valve (15) are arranged in the engine exhaust passage of an internal combustion engine. A region which is a limited portion of the upstream-side end-surface peripheral part of the exhaust gas purification catalyst (13), where there is a possibility of clogging due to deposition of fine particles in the exhaust gas, is predicted to be a fine particle deposition region, and an air-fuel ratio sensor (23) is arranged within an exhaust gas circulation region, which is downstream from the downstream-side end-surface peripheral part of the exhaust purification catalyst (13) and is downstream from the fine particle deposition region when viewed along the longitudinal axis of the exhaust purification catalyst. When the air-fuel ratio of the exhaust gas flowing into the exhaust purification catalyst (13) momentarily changes and the rate of change of the output value from, the air-fuel ratio sensor (23) decreases, it is determined that clogging due to deposition of fine particles in the exhaust gas has occurred in the fine particle deposition (Continued)

region in the upstream-side end-surface peripheral part of the exhaust purification catalyst (13).

10 Claims, 27 Drawing Sheets

(51) Int. Cl.
*F01N 3/20* (2006.01)
*F01N 9/00* (2006.01)
*F01N 13/00* (2010.01)

(52) U.S. Cl.
CPC ......... *F01N 3/0885* (2013.01); *F01N 3/2033* (2013.01); *F01N 9/002* (2013.01); *F01N 11/002* (2013.01); *F01N 11/007* (2013.01); *F01N 13/008* (2013.01); F01N 2550/02 (2013.01); F01N 2560/025 (2013.01); F01N 2560/06 (2013.01); F01N 2610/03 (2013.01); F01N 2610/1453 (2013.01); F01N 2900/0416 (2013.01); Y02T 10/26 (2013.01); Y02T 10/47 (2013.01)

(56) References Cited

FOREIGN PATENT DOCUMENTS

| | | |
|---|---|---|
| JP | 2005-201119 | 7/2005 |
| JP | 2005-248760 | 9/2005 |
| JP | 2006177311 A * | 7/2006 |

* cited by examiner

FIG. 30

|  | | TEMPERATURE SENSOR | |
|---|---|---|---|
|  | | NORMAL | tP>MP |
| AIR-FUEL RATIO SENSOR | NORMAL | NO CLOGGING | CATALYST DETERIORATED |
| | t1>Mt | SENSOR ABNORMAL | CLOGGING |

ABNORMALITY DETECTION SYSTEM OF INTERNAL COMBUSTION ENGINE

CROSS-REFERENCE TO RELATED APPLICATIONS

This application is a national phase application of International Application No. PCT/JP2013/052240, filed Jan. 31, 2013, the content of which is incorporated herein by reference.

TECHNICAL FIELD

The present invention relates to an abnormality detection system of an internal combination engine.

BACKGROUND ART

Known in the art is an internal combustion engine wherein an $NO_X$ storage reduction catalyst is arranged in an engine exhaust passage and a hydrocarbon feed valve is arranged upstream of the $NO_X$ storage reduction catalyst and wherein, when releasing the stored $SO_X$ from, the $NO_x$ storage reduction catalyst, the hydrocarbon feed valve supplies hydrocarbons to make the temperature of the $NO_x$ storage reduction catalyst rise, then the air-fuel ratio of the exhaust gas flowing into the $NO_x$ storage reduction catalyst is intermittently made rich to release the $SO_X$ from the $NO_x$ storage reduction catalyst (for example, see PTL 1). In this regard, if hydrocarbons are supplied upstream of the $NO_X$ storage reduction catalyst in this way, sometimes the $NO_x$ storage reduction catalyst becomes clogged. In this case, PTL 1 describes that if the $NO_x$ storage reduction catalyst becomes clogged, when hydrocarbons are supplied, compared with when not clogged, the air-fuel ratio of the exhaust gas flowing out from the $NO_x$ storage reduction catalyst becomes lean and, further, that if the $NO_x$ storage reduction catalyst becomes clogged, when hydrocarbons are supplied to make the temperature of the $NO_x$ storage reduction catalyst rise, compared with when not clogged, the speed of temperature rise of the $NO_x$ storage reduction catalyst becomes slower and therefore it can be judged from these if the $NO_x$ storage reduction catalyst has become clogged.

CITATION LIST

Patent Literature

PTL 1. Japanese Patent Publication No. 2005-248760A

SUMMARY OF INVENTION

Technical Problem

In this regard, when the $NO_x$ storage reduction catalyst becomes considerably clogged, the air-fuel ratio of the exhaust gas flowing out from the $NO_x$ storage reduction catalyst becomes the lean side, so the fact that the $NO_x$ storage reduction catalyst has become clogged can be detected. However, when the particulate in the exhaust gas deposits on a part of the peripheral portion of the upstream side end face of the exhaust purification catalyst and thereby deposition of particulate causes clogging at a part of the upstream side end face of the exhaust purification catalyst, even if the hydrocarbon feed valve supplies hydrocarbons, compared with when not clogged, the value of the air-fuel ratio of the exhaust gas flowing out from the $NO_x$ storage reduction catalyst does not change much at all. Therefore, if deposition of particulate causes clogging at a part of the upstream side end face of the exhaust purification catalyst, even if detecting the lean degree or rich degree of the air-fuel ratio of the exhaust gas flowing out from the $NO_x$ storage reduction catalyst, it is not possible to detect the fact that the deposition of particulate causes clogging at a part, of the upstream side end face of the exhaust purification catalyst.

An object of the present invention is to provide an abnormality detection system of an internal combustion engine which enables detection of occurrence of clogging due to deposition of particulate even when clogging due to deposition of particulate occurs at a part of the upstream side end face of the exhaust purification catalyst.

Solution to Problem

According to the present invention, there is provided an abnormality detection system of an internal combustion engine wherein an exhaust purification catalyst is arranged in an engine exhaust passage, a hydrocarbon feed valve is arranged in the engine exhaust passage upstream of the exhaust purification catalyst, the exhaust purification catalyst is comprised of a straight flow type catalyst having a plurality of exhaust flow paths which extend in a longitudinal axial direction of the exhaust purification catalyst, a limited partial region where deposition of particulate in the exhaust gas may cause clogging at a peripheral portion of an upstream side end face of the exhaust purification catalyst is predicted in advance as a particulate deposition region, an air-fuel ratio sensor is arranged downstream of a peripheral portion of a downstream side end face of the exhaust purification catalyst in an exhaust gas flow region corresponding to the downstream side of the particulate deposition region when viewed along a longitudinal axis of the exhaust purification catalyst, when an air-fuel ratio of an exhaust gas flowing into the exhaust purification catalyst is made to instantaneously change, if deposition of particulate in the exhaust gas causes clogging at the particulate deposition region in the peripheral portion of the upstream side end face of the exhaust purification catalyst, a speed of change of an output value of the air-fuel ratio sensor falls compared with when deposition of the particulate does not cause clogging, when if is judged whether deposition of particulate in the exhaust gas causes clogging at the particulate deposition region in the peripheral portion of the upstream side end face of the exhaust purification catalyst, the air-fuel ratio of the exhaust gas flowing into the exhaust purification catalyst is made to instantaneously change and, when the speed of change of the output value of the air-fuel ratio sensor falls at this time, it is judged that deposition of particulate in the exhaust gas causes clogging at the particulate deposition region in the peripheral portion or the upstream side end face of the exhaust purification catalyst.

Advantageous Effects of Invention

Even when deposition of particulate causes clogging at a part of the upstream side end face of the exhaust purification catalyst, it is possible to detect that deposition of particulate causes clogging based on the fact that the speed of change of the output value of the air-fuel ratio sensor falls.

BRIEF DESCRIPTION OF DRAWINGS

FIG. 30 is a table for explaining a judgement as to whether or not a clogging occurs.

DESCRIPTION OF EMBODIMENTS

Figure 1:
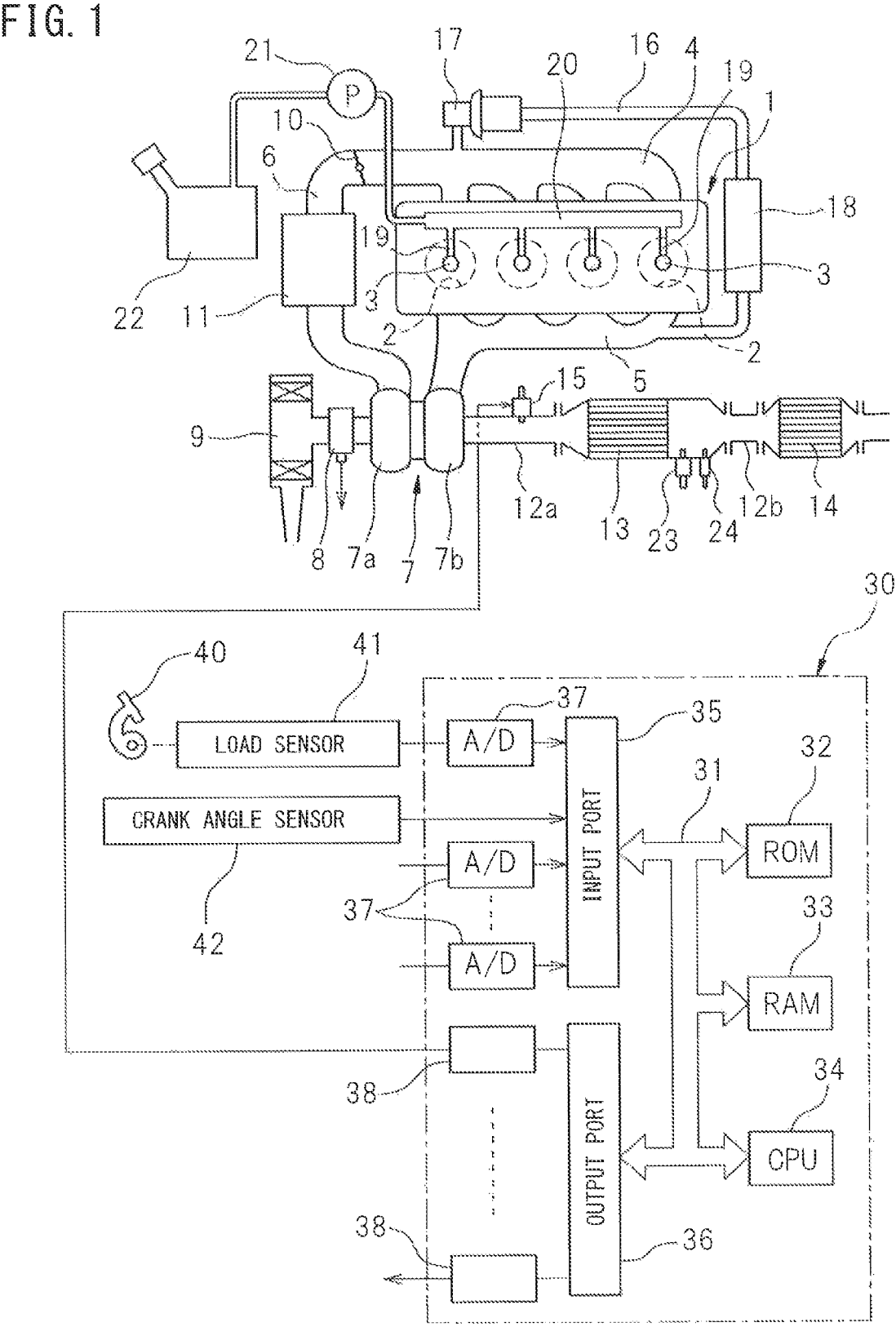
FIG. 1 is an overall view of a compression ignition type internal combustion engine.

FIG. 1 is an overall view of a compression ignition type infernal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 which is driven by an actuator is arranged. Around the intake duct 6, a cooling device 11 is arranged for cooling the intake air which flows through the inside of the intake duct 6. In the embodiment which is shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7, and an outlet of the exhaust turbine 7b is connected through an exhaust pipe 12a to an inlet of an exhaust purification catalyst 13. In an embodiment of the present invention, this exhaust purification catalyst 13 is comprised of an $NO_X$ storage catalyst 13. An outlet of the exhaust purification catalyst 13 is connected through an exhaust pipe 12b to an inlet of a particulate filter 14. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. Inside the EGR passage 16, an electronically controlled EGR control valve 17 is arranged. Further, around the EGR passage 16, a cooling device 18 is arranged for cooling the EGR gas which flows through the inside of the EGR passage 16. In the embodiment which is shown in FIG. 1, the engine cooling water is guided to the inside of the cooling device 18 where the engine cooling water is used to cool the EGR gas. On the other hand, each fuel injector 3 is connected through a fuel feed tube 19 to a common rail 20. This common rail 20 is connected through an electronically controlled variable discharge fuel pump 21 to a fuel tank 22. The fuel which is stored inside of the fuel tank 22 is fed by the fuel pump 21 to the inside of the common rail 20. The fuel which is fed to the inside of the common rail 21 is fed through each fuel feed tube 19 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. An air-fuel ratio sensor 23 for detecting the air-fuel ratio of the exhaust gas flowing out from the exhaust purification catalyst 13 is arranged downstream of the exhaust purification catalyst 13, and further a temperature sensor 24 for detecting the temperature of the exhaust gas flowing out from the exhaust purification catalyst 13 is arranged downstream of the exhaust purification catalyst 13. The output signals of the air-fuel ratio sensor 23, the temperature sensors 24 and the intake air amount detector 8 are input through respectively corresponding AD converters 37 to the input port 35. Further, an accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, the actuator for driving the throttle valve 10, hydrocarbon feed valve 15, EGR control valve 17, and fuel pump 21.

Figure 2:
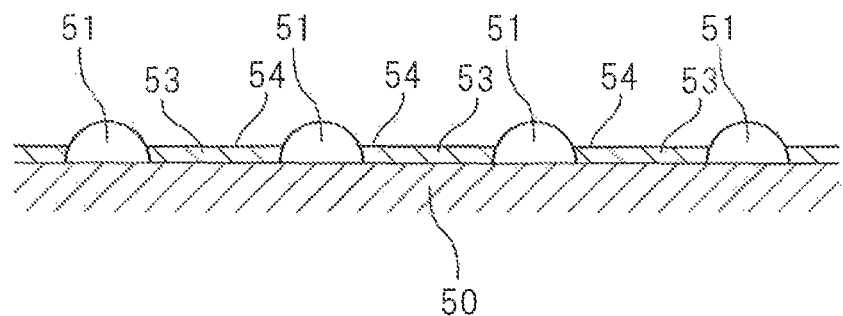
FIG. 2 is a view which schematically shows the surface part of a catalyst carrier.

FIG. 2 schematically shows a surface part of a catalyst carrier which is carried on a substrate of the exhaust purification catalyst 13 shown in FIG. 1. At this exhaust purification catalyst 13, as shown in FIG. 2, for example, there is provided a catalyst carrier 50 made of alumina on which precious metal catalysts 51 comprised of platinum Pt are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. This basic layer 53 contains ceria $CeO_2$, and accordingly the exhaust purification catalyst 13 has an oxygen storage ability. Furthermore, on the catalyst carrier 50 of the exhaust purification catalyst 13, in addition to platinum Pt, rhodium Rh or palladium Pd may be further carried. Note that the exhaust gas flows along the top of the catalyst carrier 50, so the precious metal catalysts 51 can be said to be carried on the exhaust gas flow surfaces of the exhaust purification catalyst 13. Further, the surface of the basic layer 53 exhibits basicity, so the surface of the basic layer 53 is called the "basic exhaust gas flow surface parts 54".

Figure 3:
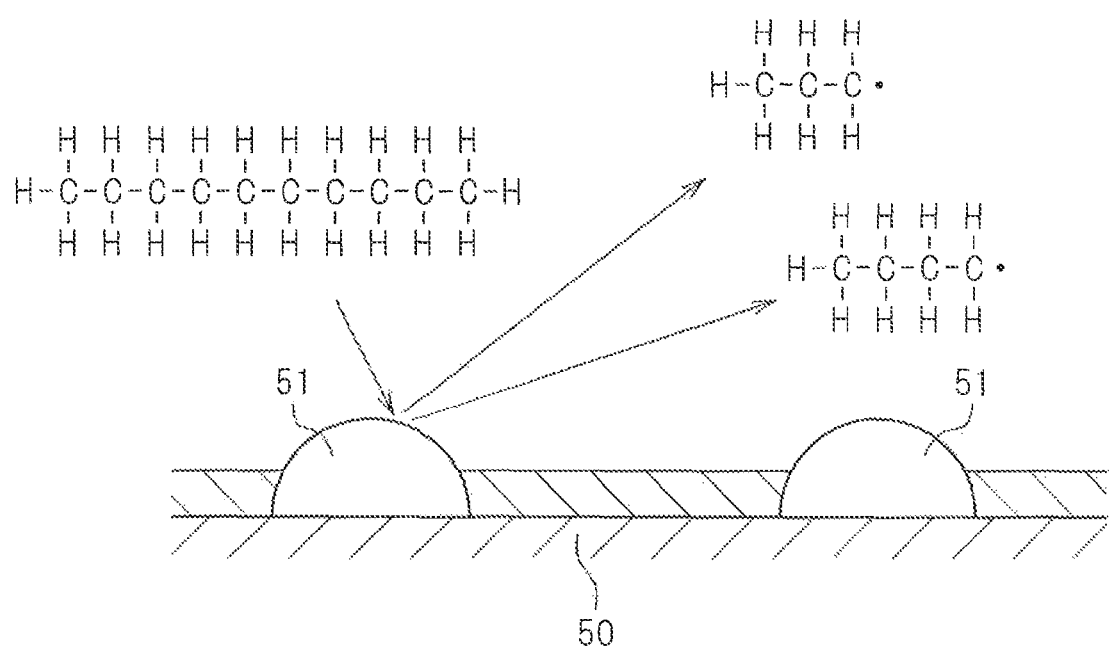
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons sire used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the precious metal catalyst 51.

Figure 4:
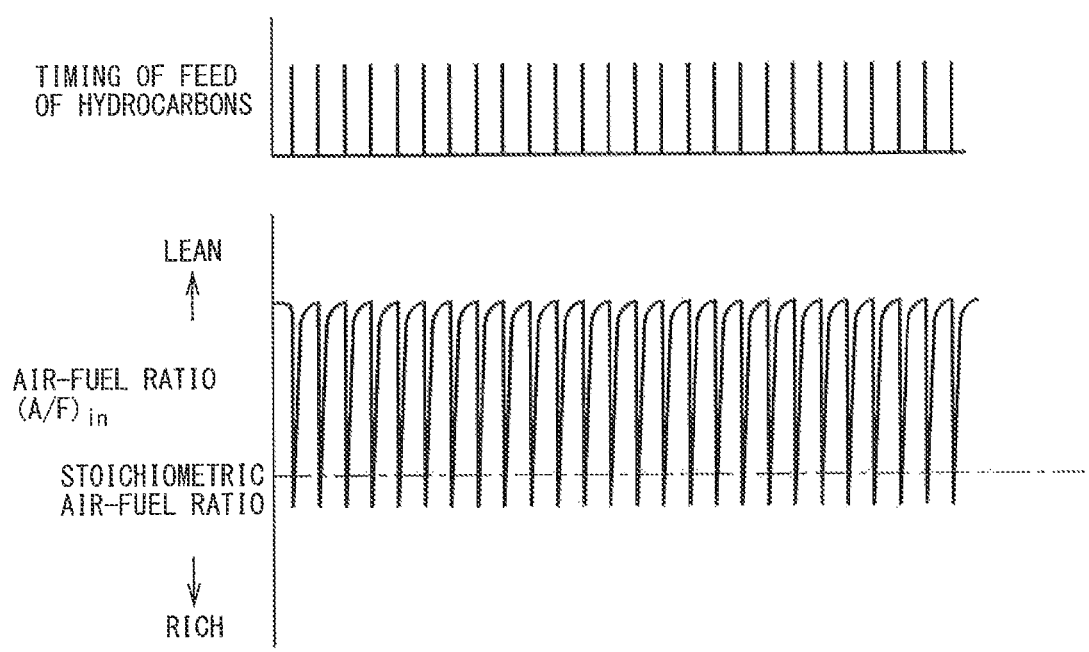
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the change in the air-fuel ratio (A/F) in depends on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
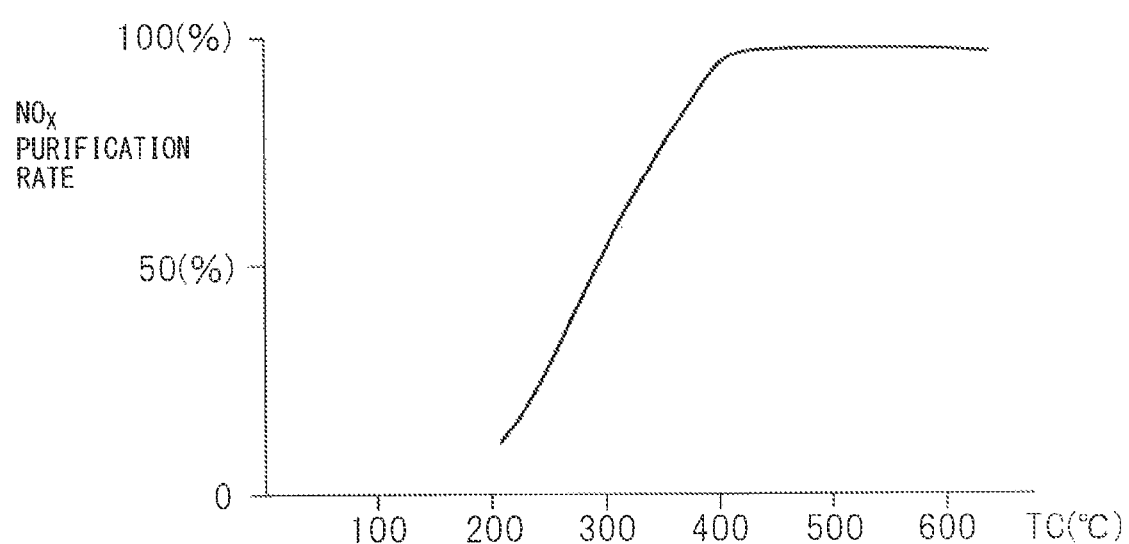
FIG. 5 is a view which shows an $NO_X$ purification rate.

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, periodically make the air-fuel ratio (A/F) in of the exhaust gas flowing to the exhaust purification catalyst 13 rich. In this regard, as a result of a research relating to $NO_X$ purification for a long time, it is learned that if making the concentration of hydrocarbons which flow into the exhaust purification catalyst 13 vibrate by within a predetermined range of amplitude and within predetermined range of period, as shown in FIG. 5, an extremely high $NO_X$ purification rate is obtained even in a 400° C. or higher high temperature region.

Figure 6A:
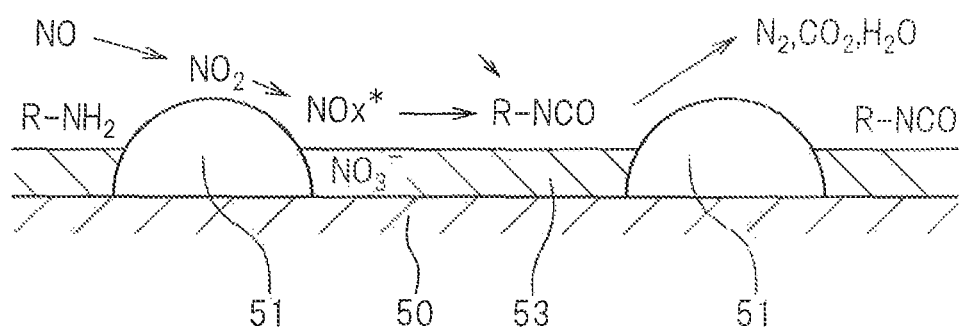
FIGS. 6A and 6B are views for explaining an oxidation reduction reaction in an exhaust purification catalyst.
Figure 6B:
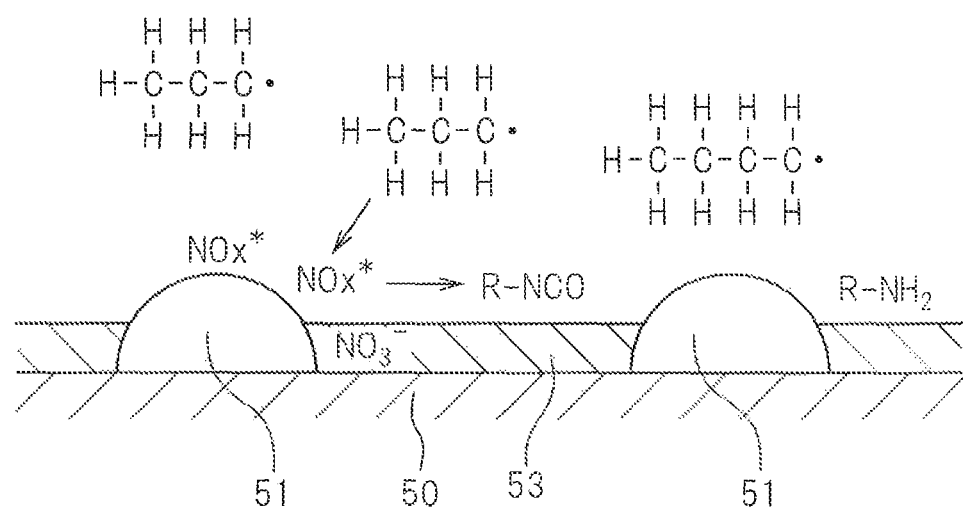

Furthermore, it is learned that at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13, and the reducing intermediates play a central role in obtaining a high $NO_X$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the air-fuel ratio (A/F) in of the exhaust gas flowing to the exhaust purification catalyst 13 is made rich, that is, the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2^-$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15 and the air-fuel ratio (A/F) in of the exhaust gas flowing to the exhaust purification catalyst 13 is made rich, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrite compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed, and thereby the concentration of oxygen around the reducing intermediates becomes higher, the reducing intermediates react with the $NO_X$ in the exhaust gas, react with the active $NO_X^*$, react with the surrounding oxygen, or break down on their own. Due to this, the reducing intermediates R—NCO and R—$NH_2$ are converted to $N_2$, $CO_2$, and $H_2O$ as shown in FIG. 6A, therefore the $NO_X$ is removed.

In this way, in the exhaust purification catalyst 13, when the concentration of hydrocarbons which flow into the exhaust purification catalyst 13 is made higher, reducing intermediates are produced, and after the concentration of hydrocarbons which flow into the exhaust purification catalyst 13 is lowered, when the oxygen concentration is raised, the reducing intermediates react with the $NO_X$ in the exhaust gas or the active $NO_X^*$ or oxygen or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas or the active $NO_X^*$ or oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas or the active $NO_X^*$ or oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in the embodiment according to the present invention, to react the $NO_X$ contained in the exhaust gas and the reformed hydrocarbons and produce the reducing intermediates R—NCO and R—$NH_2$ containing nitrogen and hydrocarbons, the precious metal catalysts 51 are carried on the exhaust gas flow surfaces of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
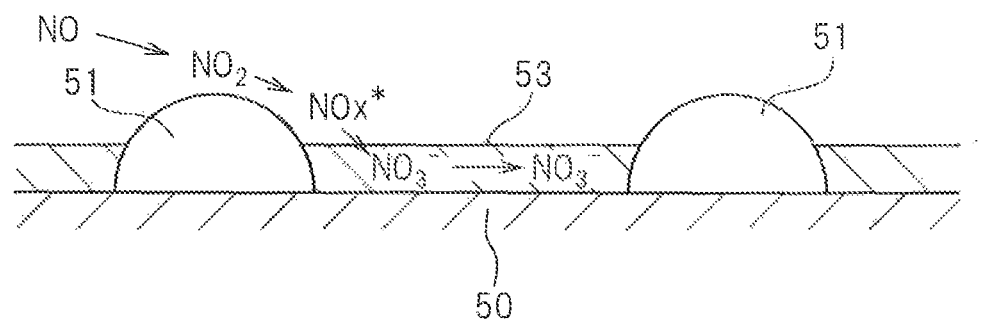
FIGS. 7A and 7B are views for explaining an oxidation reduction reaction in an exhaust purification catalyst.

If the vibration period of the hydrocarbon concentration, that is, the injection period of hydrocarbons from the hydrocarbon feed valve 15, is made longer than the above predetermined range of period, the reducing intermediates R—NCO and R—$NH_2$ disappear from the surface of the basic layer 53. At this time, the active $NO_X^*$ which is produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
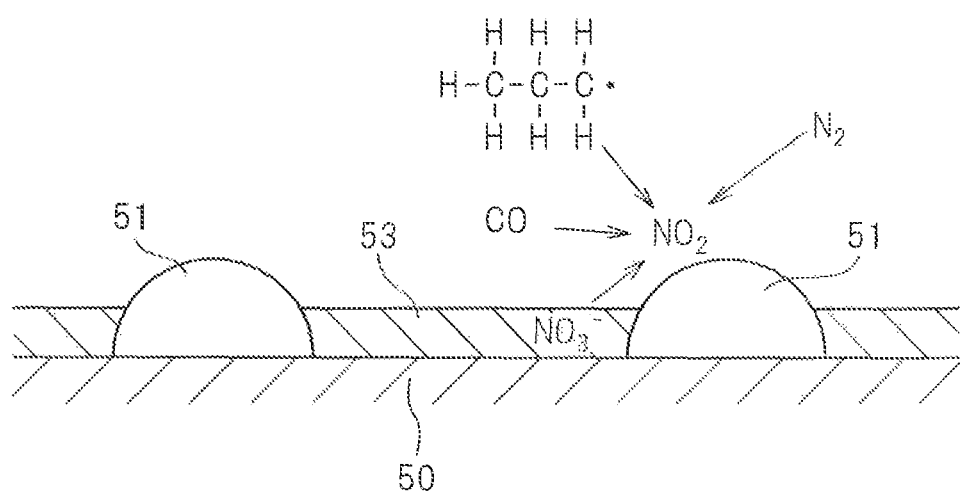

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 33 in the form of $NO_2$. Next, the released $NO_2$ is reduced by the hydrocarbons HC and CO contained in the exhaust gas.

Figure 8:
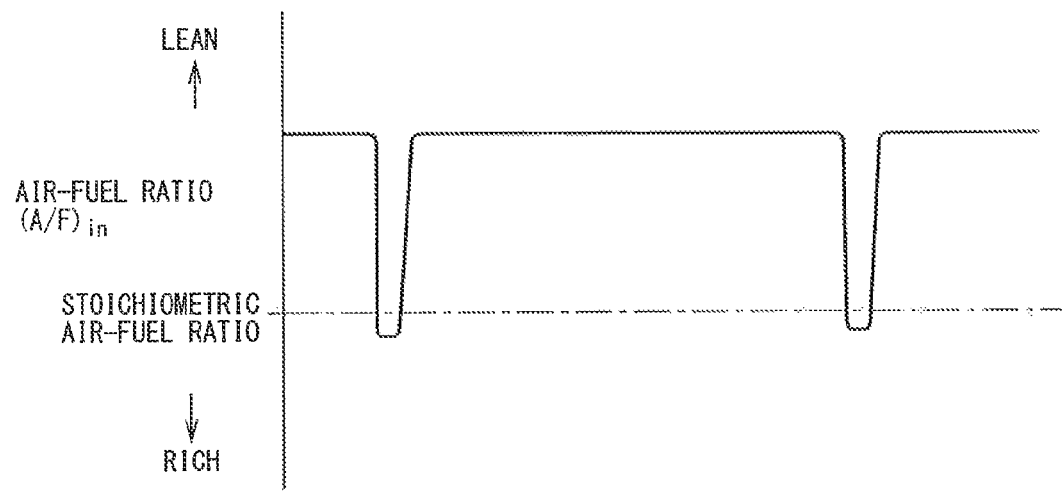
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied info the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
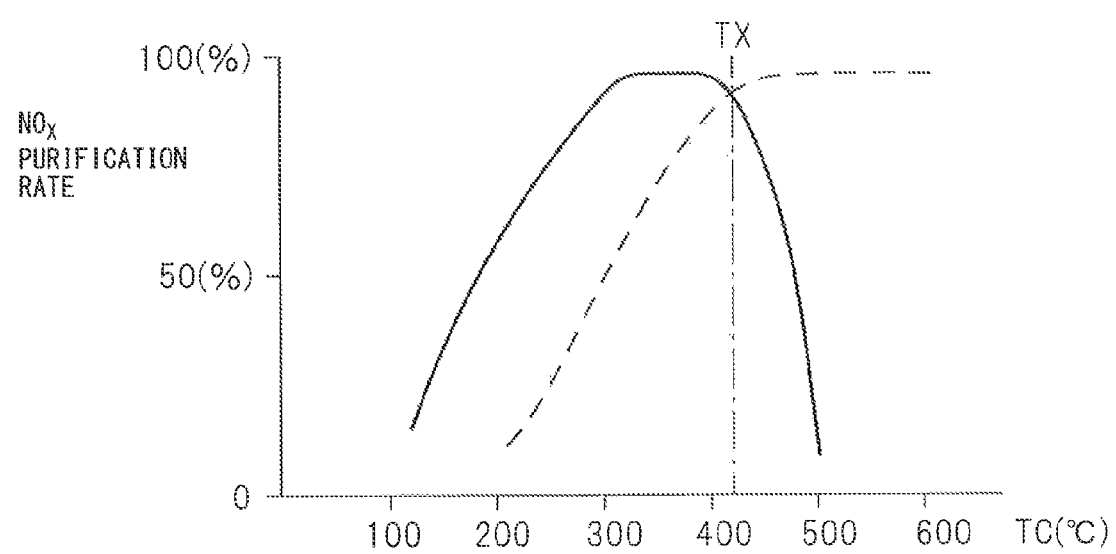
FIG. 9 is a view which shows an $NO_X$ purification rate.

The solid line in FIG. 9 shows the $NO_X$ purification rate when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown by the solid line in FIG. 9, when the catalyst temperature TC is 300° C. to 400° C., an extremely high $NO_X$ purification rate is obtained, but when the catalyst temperature TC becomes a 400° C. or higher high temperature, the $NO_X$ purification rate falls. Note that, in FIG. 9, the $NO_X$ purification rate shown in FIG. 5 is shown by the broken line.

In this way, when the catalyst temperature TC becomes 400° C. or more, the $NO_X$ purification rate falls because if the catalyst temperature TC becomes 400° C. or more, the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate. However, in the new $NO_X$ purification method shown from FIG. 4 to FIGS. 6A and 6B, the amount of $NO_X$ stored in the form of nitrates is small, and consequently, as shown in FIG. 5, even when the catalyst temperature TC is high, a high $NO_X$ purification rate is obtained.

In the embodiment according to the present invention, to be able to purify $NO_X$ by using this new $NO_X$ purification method, a hydrocarbon feed valve 15 for feeding hydrocarbons is arranged in the engine exhaust passage, an exhaust purification catalyst 13 is arranged in the engine exhaust passage downstream of the hydrocarbon feed valve 15, precious metal catalysts 51 are carried on the exhaust gas flow surfaces of the exhaust purification catalyst 13, basic exhaust gas flow surface parts 54 are formed around the precious metal catalysts 51, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons are injected from the hydrocarbon feed valve 15 within the predetermined range of period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification meshed designed to remove $NO_X$ without forming so much nitrates in the case of using an exhaust purification catalyst which carries previous metal catalysts and forms a basic layer which can absorb $NO_X$. In actuality, when using this new $NO_X$ purification method, the nitrates which are detected from the basic layer 53 become smaller in amount compared with the case where making the exhaust purification catalyst 13 function as an $NO_X$ storage catalyst. Note that, this new $NO_X$ purification method will be referred to below as the "first $NO_X$ purification method".

Figure 10:
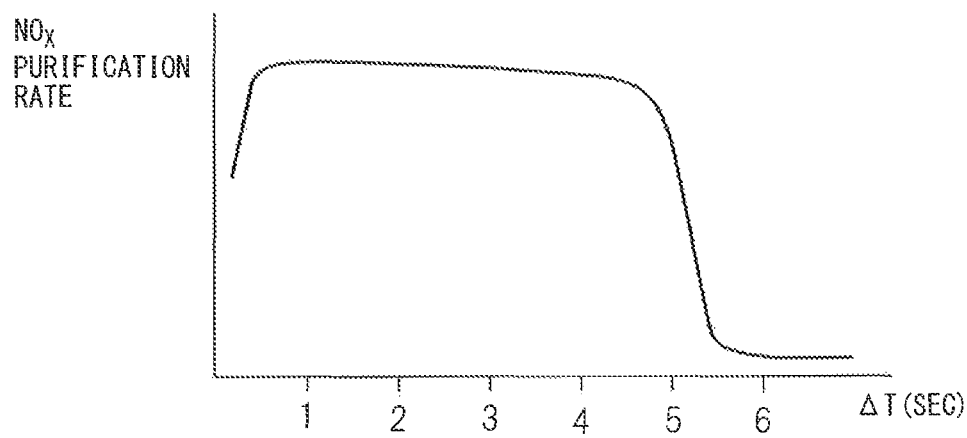
FIG. 10 is a view which shows a relationship between a vibration period ΔT of hydrocarbon concentration and an $NO_X$ purification rate.

Now, as mentioned before, if the injection period $\Delta T$ of the hydrocarbons from the hydrocarbon feed valve 15 becomes longer, the time period in which the oxygen concentration around the active $NO_X^*$ becomes higher becomes longer in the time period after the hydrocarbons are injected to when the hydrocarbons are next injected. In this case, in the embodiment shown in FIG. 1, if the injection period $\Delta T$ of the hydrocarbons becomes longer than about 5 seconds, the active $NO_X^*$ starts to be absorbed in the form of nitrates inside the basic layer 53. Therefore, as shown in FIG. 10, if the vibration period $\Delta T$ of the hydrocarbon concentration becomes longer than about 5 seconds, the $NO_X$ purification rate falls. Therefore, the injection period $\Delta T$ of the hydrocarbons has to be made 5 seconds or less.

On the other hand, in the embodiment of the present invention, if the injection period $\Delta T$ of the hydrocarbons becomes about 0.3 second or less, the injected hydrocarbons start to build up on the exhaust gas flow surfaces of the exhaust purification catalyst 13, therefore, as shown in FIG. 10, if the injection period $\Delta T$ of the hydrocarbons becomes about 0.3 second or less, the $NO_X$ purification rate falls. Therefore, in the embodiment according to the present invention, the injection period of the hydrocarbons is made from 0.3 second to 5 seconds.

Figure 11:
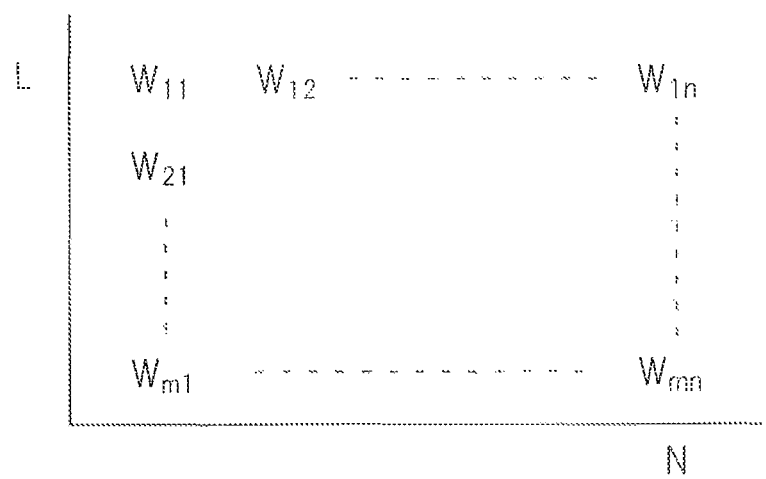
FIG. 11 is a view which shows a map of the injection amount of hydrocarbons.

Now, in the embodiment according to the present invention, by controlling the injection amount and injection timing of hydrocarbons from the hydrocarbon feed valve 15, the air-fuel ratio (A/F) in of the exhaust gas flowing into the exhaust purification catalyst 13 and the injection period $\Delta T$ of the hydrocarbons are controlled so as to become the optimal values for the engine operating state. In this case, in the embodiment according to the present invention, the optimum hydrocarbon injection amount WT when the $NO_X$ purification action by the first $NO_X$ purification method is performed is stored as a function of the amount of depression L of the accelerator pedal 40 from fuel injectors 3 and the engine speed N in the form of a map such as shown in FIG. 11 in advance in the ROM 32. Further, the optimum injection period $\Delta T$ of the hydrocarbons at this time is also stored as a function of the amount of depression L of the accelerator pedal 40 and the engine speed N in the form of a map in advance in the ROM 32.

Next, referring to FIG. 12 to FIG. 15, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 12:
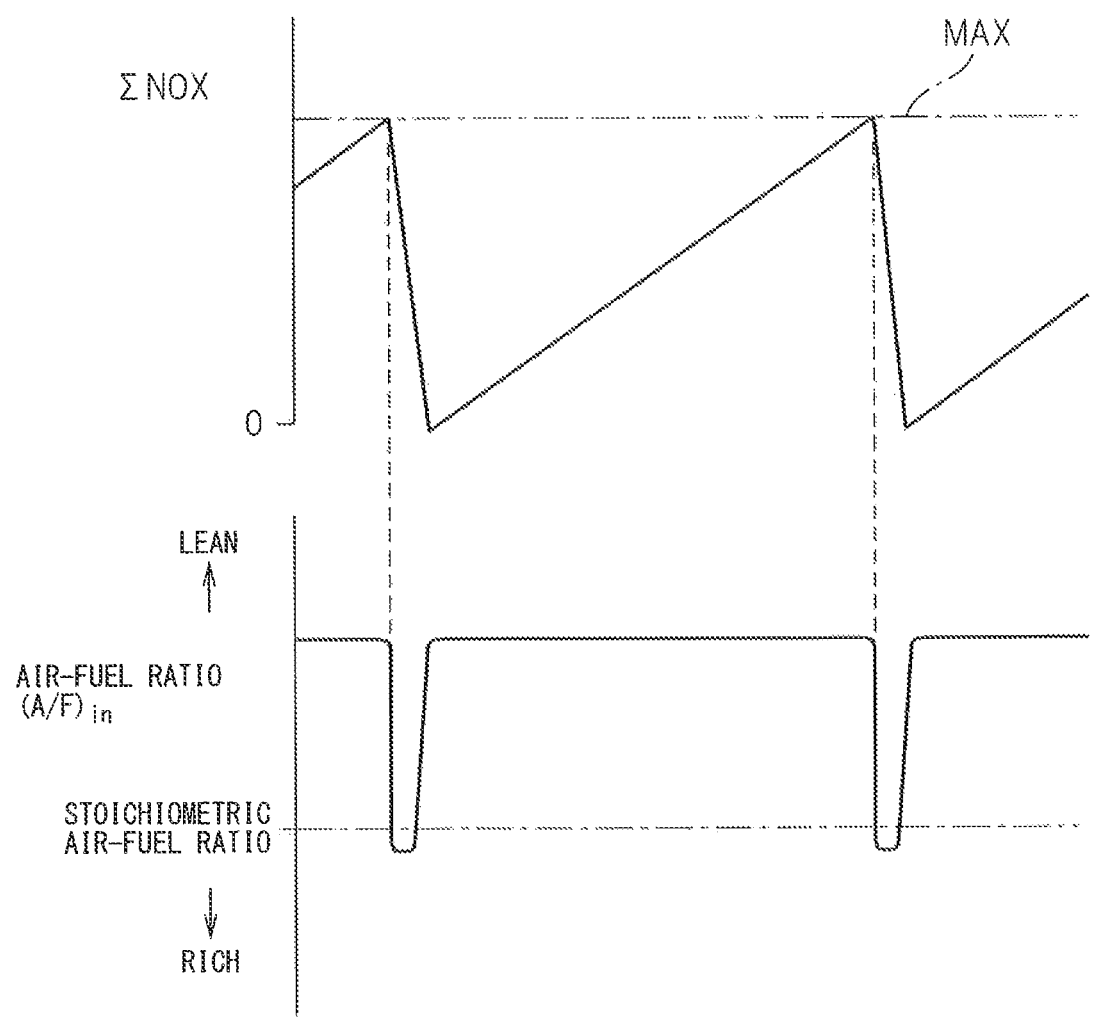
FIG. 12 is a view which shows an $NO_X$ release control.

In this second $NO_X$ purification method, as shown in FIG. 12, when the stored $NO_X$ amount $\Sigma NO_X$ of $NO_X$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_X$ which was stored in the basic layer 53 when the air-fuel ratio (A/F) in of the exhaust gas was lean is released from the basic layer 53 all at once and reduced. Due to this, the $NO_X$ is removed.

Figure 13:
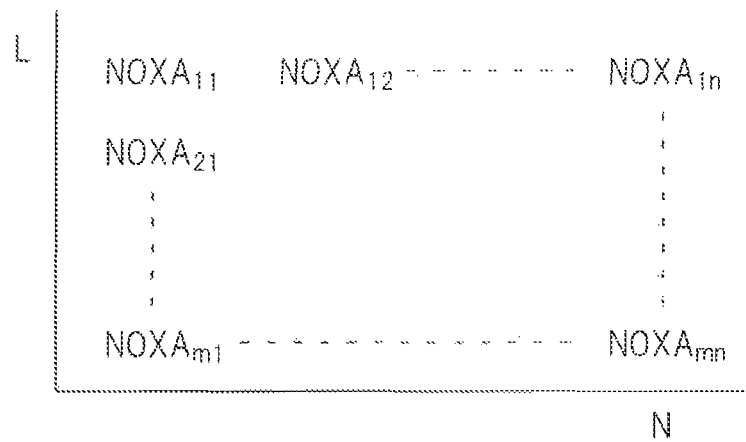
FIG. 13 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the amount of depression L of the accelerator pedal 40 and the engine speed N in the form of a map such as shown in FIG. 13 in advance in the ROM 32. The stored $NO_X$ amount $\Sigma NO_X$ is calculated from this exhausted $NO_X$ amount NOXA. In this case, as explained before, the period at which the air-fuel ratio (A/F) in of the exhaust gas is made rich is usually 1 minute or more.

Figure 14:
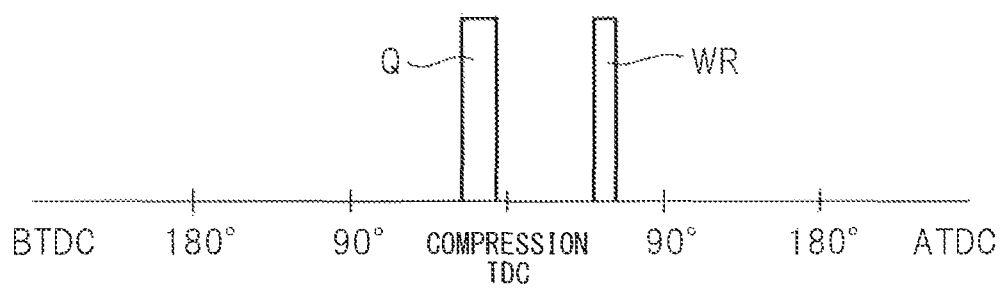
FIG. 14 is a view which shows a fuel injection timing.
Figure 15:
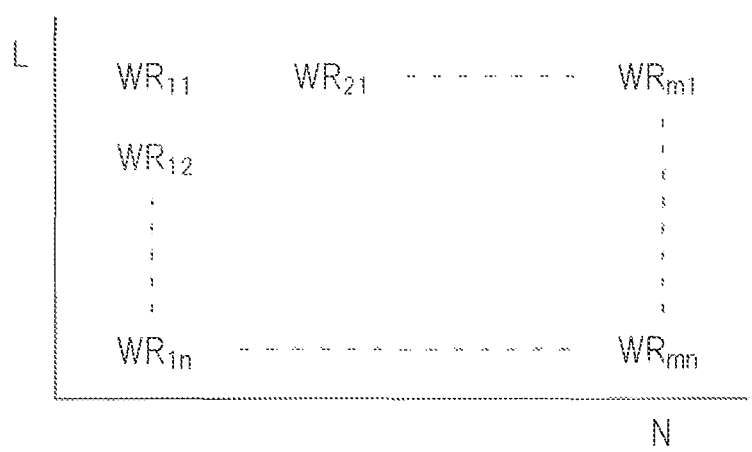
FIG. 15 is a view which shows a map of an additional hydrocarbon feed amount WR.

In this second $NO_X$ purification method, as shown in FIG. 14, by injecting an additional fuel WR into each combustion chamber 2 from true fuel injector 3 in addition to the combustion-use fuel Q, the air-fuel ratio (A/F) in of the exhaust gas which flows into the exhaust purification catalyst 13 is made rich. Note that, in FIG. 14, the abscissa indicates the crank angle. This additional fuel WR is injected at a timing at which it will burn, but will not appear as engine output, that is, slightly before ATDC90° after compression top dead center. This fuel amount WR is stored as a function of the amount of depression L of the accelerator pedal 40 and the engine speed N in the form of a map such as shown in FIG. 15 in advance in the ROM 32. Of course, in this case, the air-fuel ratio (A/F) in of the exhaust gas flowing into the exhaust purification catalyst 13 may be made rich by increasing an injection amount of hydrocarbons from the hydrocarbon feed valve 15.

Now, the exhaust gas which is exhausted from an engine contains various particulates, but usually these particulates slip through the exhaust purification catalyst 13, therefore usually these particulates never deposit on the upstream side end face of the exhaust purification catalyst 13 or inside the exhaust purification catalyst 13. In this regard, if the above-mentioned new $NO_x$ removal method, that is, the first $NO_x$ removal method, is used to remove the $NO_x$, in addition to the particulate which is exhausted from the engine, the hydrocarbons which are injected from the hydrocarbon feed valve 15 flow into the exhaust purification catalyst 13 with a high frequency, so these particulate and hydrocarbons gradually deposit at the upstream side end face of the exhaust purification catalyst 13. Note that, in this case, if referring to the particulate which is exhausted from the engine and the hydrocarbons which are injected from the hydrocarbon feed valve 15 as the "particulate in the exhaust gas", when the $NO_x$ removal action by the first $NO_x$ removal method is being performed, the particulate in the exhaust gas deposits on the upstream side end face of the exhaust purification catalyst 13.

In this regard, generally speaking, exhaust gas does not flow uniformly to the upstream side end face of the exhaust purification catalyst 13 due to the effects of the structure etc. of the engine exhaust system. On top of that, the particulate which is exhausted from the engine or the hydrocarbons which are injected from the hydrocarbon feed valve 15, that is, the particulate in the exhaust gas, usually does not uniformly flow to the upstream side end face of the exhaust purification catalyst 13. That is, the particulate in the exhaust gas usually lopsidedly flows to a partial region of the upstream side end face of true exhaust purification catalyst 13. If in this way, if particulate in the exhaust gas continues to lopsidedly flow to a partial region of the upstream side end face of the exhaust purification catalyst 13, deposition of particulate in the exhaust gas will cause clogging. Next, this will be explained with reference to FIGS. 16A and 16B.

Figure 16A:
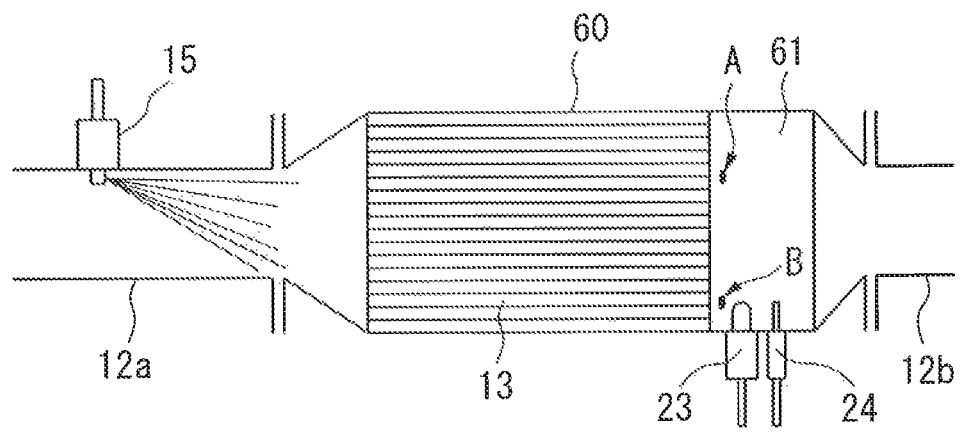
FIGS. 16A and 16B are enlarged views which show the surrounding of an exhaust purification catalyst shown in FIG. 1.
Figure 16B:
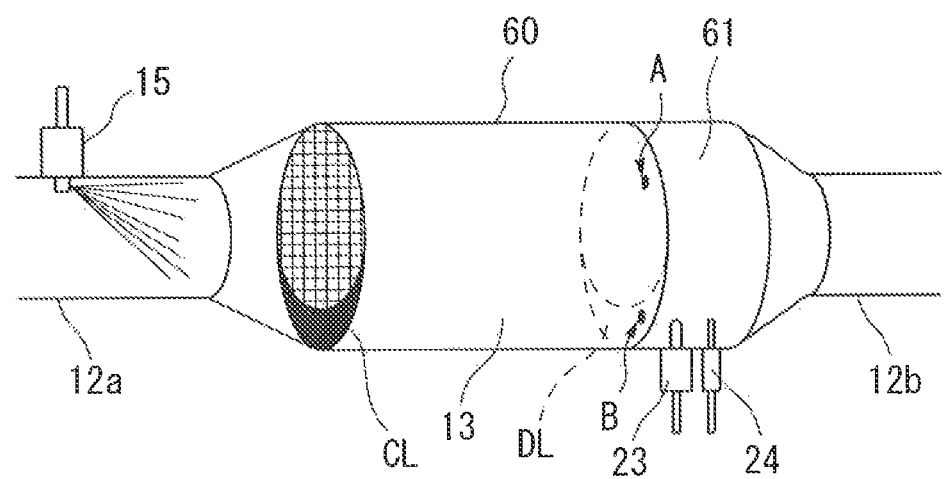

FIG. 16A shows an enlarged view of the exhaust purification catalyst 13 of FIG. 1, while FIG. 16B shows a perspective view of FIG. 16A. In this embodiment according to the present invention, as shown in FIGS. 16A and 16B, the exhaust purification catalyst 13 is housed in a tubular shaped casing 60. At the inside back end of the casing 60, a sensor placement space 61 which has the same diameter as the downstream side end face of the exhaust purification catalyst 13 is formed. As will be understood from FIGS. 16A and 16B, the air-fuel ratio sensor 23 and temperature sensor 24 are arranged inside this sensor placement space 61. Further, as will be understood from FIGS. 16A and 16B, in this embodiment according to the present invention, the exhaust purification catalyst 13 is comprised of a straight flow type catalyst which has a plurality of exhaust flow paths which extend in the axial direction of the exhaust purification catalyst 13. Exhaust gas which flows from the upstream side end face of the exhaust purification catalyst 13 to the exhaust purification catalyst 13 flows straight through the inside of the exhaust flow paths of the inside of the exhaust purification catalyst 13 along the axis of the exhaust purification catalyst 13 and flows out from the downstream side end face of the exhaust purification catalyst 13.

Figure 17A:
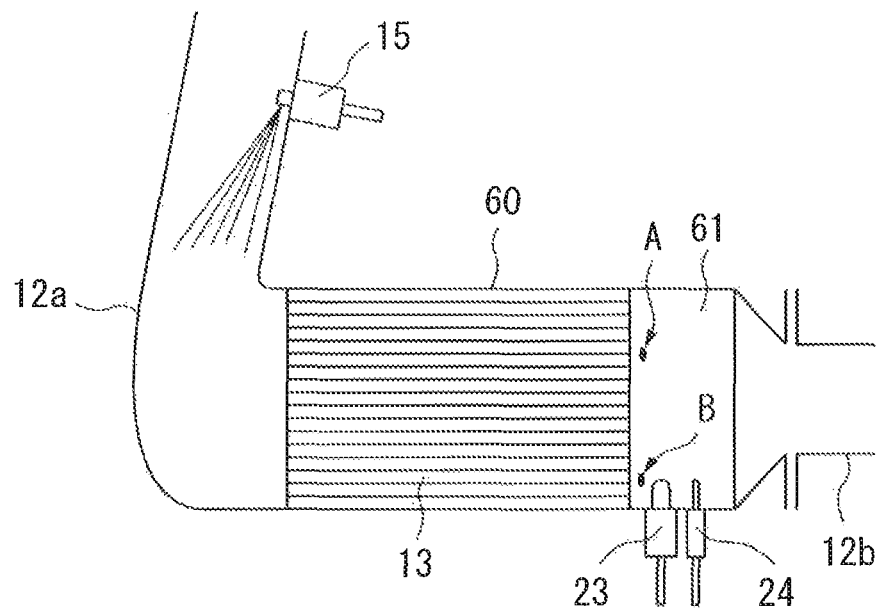
FIGS. 17A and 17B are enlarged views which show the surrounding of an alternative embodiment of an exhaust purification catalyst.
Figure 17B:
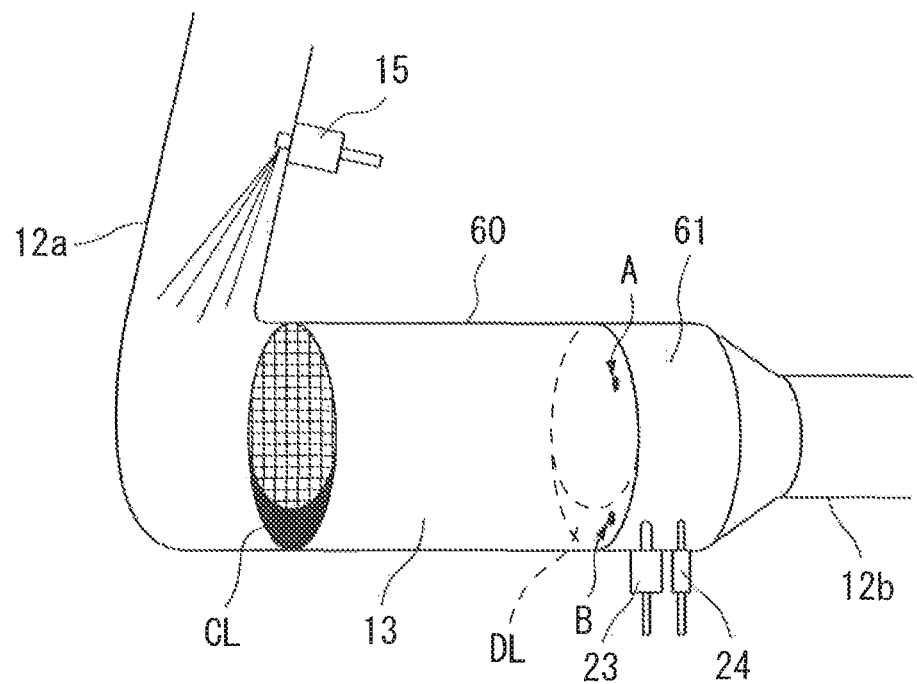

Now, in many cases, the particulate in exhaust gas will lopsidedly flow to somewhere of the peripheral region of the upstream side end face of the exhaust purification catalyst 13. FIGS. 16A and 16B show the case where the particulate in the exhaust gas lopsidedly flows into the lower region CL of the peripheral portion of the upstream side end face of the exhaust purification catalyst 13 and, as a result, deposition of particulate in the exhaust gas causes clogging in the lower region CL of the peripheral portion of the upstream side end face of the exhaust purification catalyst 13. Usually, if the structure of the engine exhaust system or the mounting position of the hydrocarbon feed valve 15 is determined, the clogging region CL at the upstream side end face of the exhaust purification catalyst 13 is uniquely determined corresponding to this. FIGS. 17A and 17B show a specific example where the exhaust pipe 12a is bent by 90 degrees or more in front of the upstream side end face of the exhaust purification catalyst 13 and the hydrocarbon feed valve 15 is attached upstream from this bent part. In this specific example, it can be easily understood that the clogging region CL is formed at the peripheral portion of the upstream side end face of the exhaust purification catalyst 13, which peripheral portion is located in a direction opposite to the direction of extension of the exhaust pipe 12a.

In this way, a limited partial region CL where deposition of particulate in the exhaust gas may cause clogging at the peripheral portion of the upstream side end face of the exhaust purification catalyst 13 can be predicted in advance. Therefore, in this embodiment according to the present invention, a limited partial region CL where deposition of particulate in the exhaust gas may cause clogging at the peripheral portion of the upstream side end face of the exhaust purification catalyst 13 is predicted in advance as the "particulate deposition region". In this case, in actuality this particulate deposition region CL is found by experiments.

Further, in this embodiment according to the present invention, the exhaust purification catalyst 13 is comprised of a straight flow type catalyst which has a plurality of exhaust flow paths which extend in the axial direction of the exhaust purification catalyst 13. Therefore, in FIGS. 16B and 17B, the exhaust gas which flows into the exhaust flow paths from the particulate deposition region CL flows out from the corresponding region DL on the downstream side end face of the exhaust purification catalyst 13 which is positioned on the opposite side from the particulate deposition region CL on the longitudinal axis of the exhaust purification catalyst 13. In this case, in this embodiment according to the present invention, as will be understood from FIGS. 16B and 17B, the air-fuel ratio sensor 23 is arranged immediately downstream of the corresponding region DL on the downstream side end face of the exhaust purification catalyst 13. That is, in this embodiment according to the present invention, the air-fuel ratio sensor 23 is arranged downstream of the peripheral portion of the downstream side end face of the exhaust purification catalyst 13 in the exhaust gas flow region which corresponds to the downstream side of the particulate deposition region CL when seen along the longitudinal axis of the exhaust purification catalyst 13.

Now, when the $NO_x$ removal action by the first $NO_x$ removal method is being performed, the major part of the hydrocarbons which are injected from the hydrocarbon feed valve 15 is used for consuming the oxygen in the exhaust purification catalyst 13. Only the remaining part of the hydrocarbons is used for generating the reducing intermediate. In this case, even if the amount of hydrocarbons which flow into the exhaust purification catalyst 13 is decreased, the amount of hydrocarbons which are used for consuming oxygen does not change. At this time, the amount of hydrocarbons which are used for generating the reducing intermediate is decreased. Therefore, if the amount of hydrocarbons which flow into the exhaust purification catalyst 13 decreases, the amount of generation of the reducing intermediate decreases and as a result the $NO_x$ removal rate falls.

Now, if deposition of particulate causes clogging at a partial region at the upstream side end face of the exhaust purification catalyst 13, that is, the particulate deposition region CL, the amount of hydrocarbons which flow into the exhaust purification catalyst 13 decreases. As a result, as explained above, the amount of generation of the reducing intermediate decreases and the $NO_x$ removal rate falls. When in this way the $NO_x$ removal action by the first $NO_x$ removal method is being performed, if the amount of hydrocarbons which flow into the exhaust purification catalyst 13 decreases slightly, the $NO_x$ removal rate greatly falls. Therefore, if deposition of particulate causes clogging at just a partial region of the upstream side end face of the exhaust purification catalyst 13, the $NO_x$ removal rate greatly falls. Therefore, in this embodiment according to the present invention, when the clogging rate of the upstream side end face of the exhaust purification catalyst 13 becomes a certain rate, end face regeneration control for removing the particulate deposited at the upstream side end face of the exhaust purification catalyst 13 is performed. Due to this, the $NO_x$ removal, rate is restored.

Figure 18:
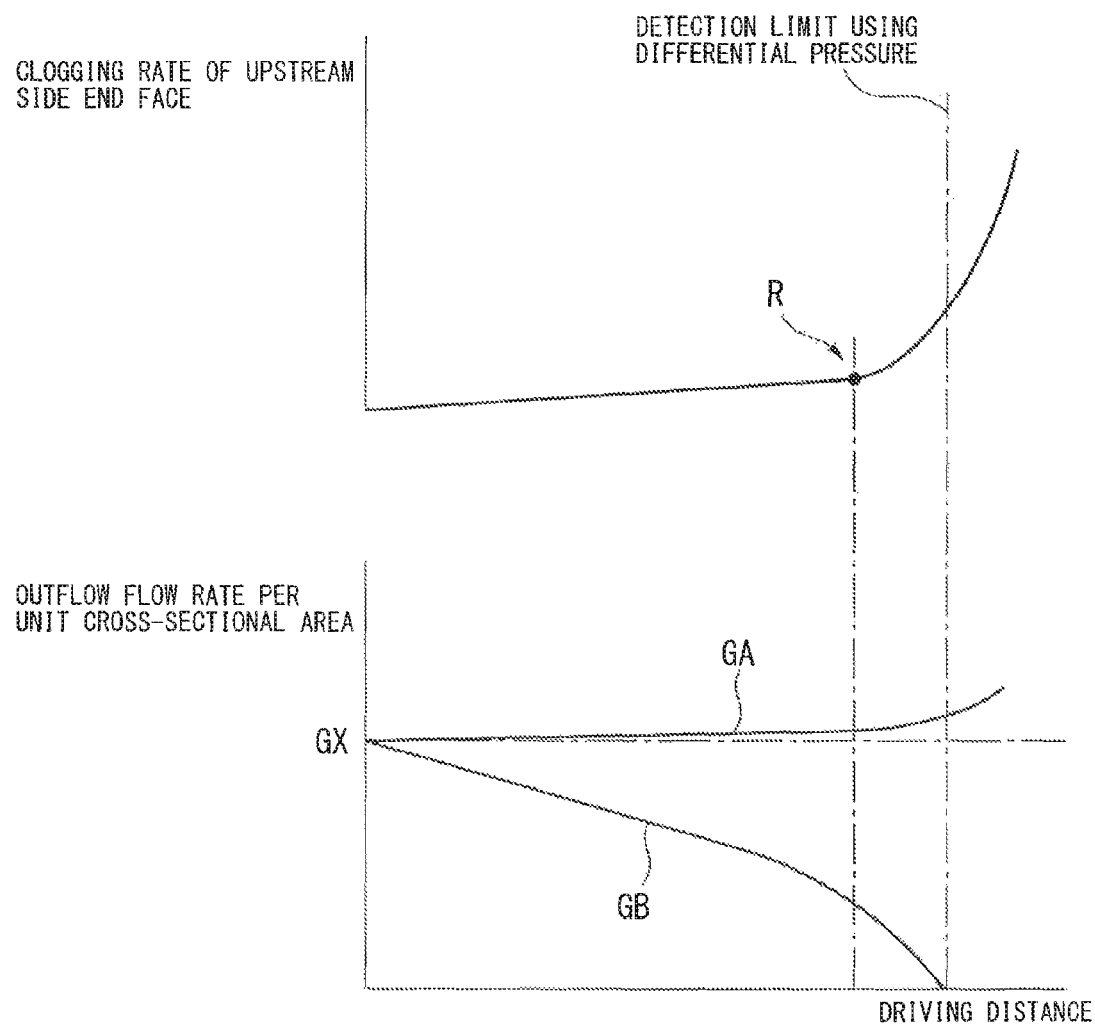
FIG. 18 is a view which shows a clogging rate of the end face and a change in a flow rate per a unit cross-sectional area.

FIG. 18 shows the change of the clogging rate of the upstream side end face of the exhaust purification catalyst 13 with respect to the driving distance of the vehicle and the change of the outflow flow rate per unit cross-sectional area from the downstream side end face of the exhaust purification catalyst 13 downstream of the particulate deposition region CL. As shown in FIG. 18, as the driving distance of the vehicle increases, the clogging rate of the upstream side end face of the exhaust purification catalyst 13 first increases a little at a time and starts to rapidly increase if exceeding a certain point of time R. In this embodiment according to the present invention, when the clogging rate of the upstream side end face of the exhaust purification catalyst 13 reaches this point R, end face regeneration control for removing the particulate deposited at the upstream side end face of the exhaust purification catalyst 13 is performed.

In this regard, even if deposition of particulate causes clogging at a partial region of the upstream side end face of the exhaust purification catalyst 13, that is, the particulate deposition region CL, the differential pressure before and after the exhaust purification catalyst 13 does not change much at all. The differential pressure before and after the exhaust purification catalyst 13 becomes larger and clogging of the upstream side end face of the exhaust purification catalyst 13 can be detected when the amount of deposited particulate becomes considerably great at the upstream side end face of the exhaust purification catalyst 13. Note that, FIG. 18 shows the detection limit which enables detection of clogging of the upstream side end face of the exhaust purification catalyst 13 by the differential pressure before and after the exhaust purification catalyst 13. From FIG. 18, the clogging rate of the upstream side end face of the exhaust purification catalyst 13 at the point R is considerably lower than the clogging rate which can be detected by the differential pressure before and after the exhaust purification catalyst 13, therefore, it is not possible to determine from the differential pressure before and after the exhaust purification catalyst 13 whether to perform the end face regeneration control for removing the particulate deposited at upstream side end face of the exhaust purification catalyst 13.

On the other hand, in FIG. 18, GX shows the outflow flow rate per unit cross-sectional area from the downstream side end face of the exhaust purification catalyst 13 when no particulate at all deposits at the upstream side end face of the exhaust purification catalyst 13, while GA and GB, as shown in FIGS. 17A to 18B, show the outflow flow rates per unit cross-sectional area from the downstream side end face of the exhaust purification catalyst 13 when deposition of particulate causes clogging at the particulate deposition region CL of the upstream side end face of the exhaust purification catalyst 13. Note that, GA shows the outflow flow rate from the region on the downstream side end face of the exhaust purification catalyst 13 which region is positioned at the opposite side from the upstream side end face region where particulate is not deposited on the longitudinal axis of the exhaust purification catalyst 13, that is, the outflow flow rate at the point A of FIGS. 16A to 17B, while GB shows the outflow flow rate from the region DL on the downstream side end face of the exhaust purification catalyst 13 which region is positioned at the opposite side from the particulate deposition region CL on the longitudinal axis of the exhaust purification catalyst 13, that is, the outflow flow rate at the point B of FIGS. 16A to 17B.

As will be understood from FIG. 18, even if the driving distance of the vehicle becomes long and deposition of particulate causes clogging at the particulate deposition region CL or the upstream side end face of the exhaust purification catalyst 13, the outflow flow rate GA at the point A of FIGS. 16A to 17B will only increase slightly from the outflow flow rate GX. As opposed to this, the outflow flow rate GB at the point B of FIGS. 16A to 17B greatly decreases from the outflow flow rate GX. In this case, if making the air-fuel ratio of the exhaust gas which flows into the exhaust purification catalyst 13 instantaneously change, a difference arises in the change of the air-fuel ratio of the exhaust gas which flows out from the exhaust purification catalyst 13 in accordance with the deviation of the outflow flow rate from the outflow flow rate GX. That is, in case where, as at point A of FIGS. 16A to 17B, the outflow flow rate GA does not deviate much at all from the outflow flow rate GX, when making the air-fuel ratio of the exhaust gas which flows into the exhaust purification catalyst 13 instantaneously change, the air-fuel ratio of the exhaust gas at the point A of FIGS. 16A to 17B also instantaneously changes. As opposed to this, in case where, like at the point B of FIGS. 16A to 17B, the outflow flow rate GB greatly decreases from the outflow flow rate GX, even if making the air-fuel ratio of the exhaust gas which flows into the exhaust purification catalyst 13 instantaneously change, the air-fuel ratio of the exhaust gas at the point B of FIGS. 16A to 17B does not instantaneously change.

That is, the air-fuel ratio of the exhaust gas at the point A of FIGS. 16A to 17B instantaneously changes when making the air-fuel ratio of the exhaust gas which flows into the exhaust purification catalyst 13 instantaneously change both when deposition of particulate causes clogging and does not cause clogging at the particulate deposition region CL of the upstream side end face of the exhaust purification catalyst 13. Therefore, it is not possible to judge if deposition or particulate causes clogging at the particulate deposition region CL of the upstream side end race of the exhaust purification catalyst 13 from the pattern of the change of the air-fuel ratio of the exhaust gas at the point A of FIGS. 16A to 17B when making the air-fuel ratio of the exhaust gas which flows into the exhaust purification catalyst 13 instantaneously change.

On the other hand, the air-fuel ratio of the exhaust gas at the point B of FIGS. 16A to 17B changes instantaneously when making the air-fuel ratio of the exhaust gas which flows into the exhaust purification catalyst 13 instantaneously change if deposition of particulate does not cause clogging at the particulate deposition region CL of the upstream side end face of the exhaust purification catalyst 13. As opposed to this, the air-fuel ratio of the exhaust gas at the point B of FIGS. 16A to 17B does not instantaneously change when making the air-fuel ratio of the exhaust gas which flows into the exhaust purification catalyst 13 instantaneously change if deposition of particulate causes clogging at the particulate deposition region CL of the upstream side end face of the exhaust purification catalyst 13. Therefore, it is possible to judge if deposition of particulate causes clogging at the particulate deposition region CL of the upstream side end face of the exhaust purification catalyst 13 from the pattern of the change of the air-fuel ratio of the exhaust gas at the point B of FIGS. 16A to 17B when making the air-fuel ratio of the exhaust gas which flows into the exhaust purification catalyst 13 instantaneously change.

Therefore, in the present invention, to enable detection of a change of the air-fuel ratio of the exhaust gas at the point B of FIGS. 16A to 17B, the air-fuel ratio sensor 23 is arranged downstream of the region DL on the downstream side end face of the exhaust purification catalyst 13 which region is positioned at the opposite side to the particulate deposition region CL on the longitudinal axis of the exhaust purification catalyst 13 and it is judged if deposition of particulate causes clogging at the particulate deposition region CL of the upstream side end face of the exhaust purification catalyst 13 from the change of the output value of the air-fuel ratio sensor 23. Next, the pattern of change of the output value or the air-fuel ratio sensor 23 when making the air-fuel ratio of the exhaust gas which flows into the exhaust purification catalyst 13 instantaneously change will be explained, but before that the two types of the air-fuel ratio sensor 23 which are used in the present invention will be briefly explained while referring to FIGS. 19A and 19B.

Figure 19A:
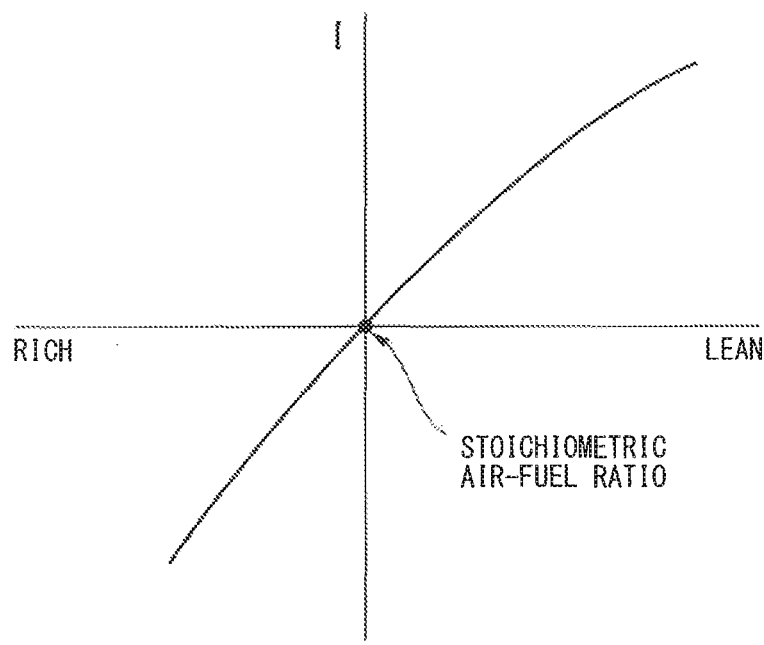
FIGS. 19A and 19B are views which show a change in the output value of an air-fuel ratio sensor.
Figure 19B:
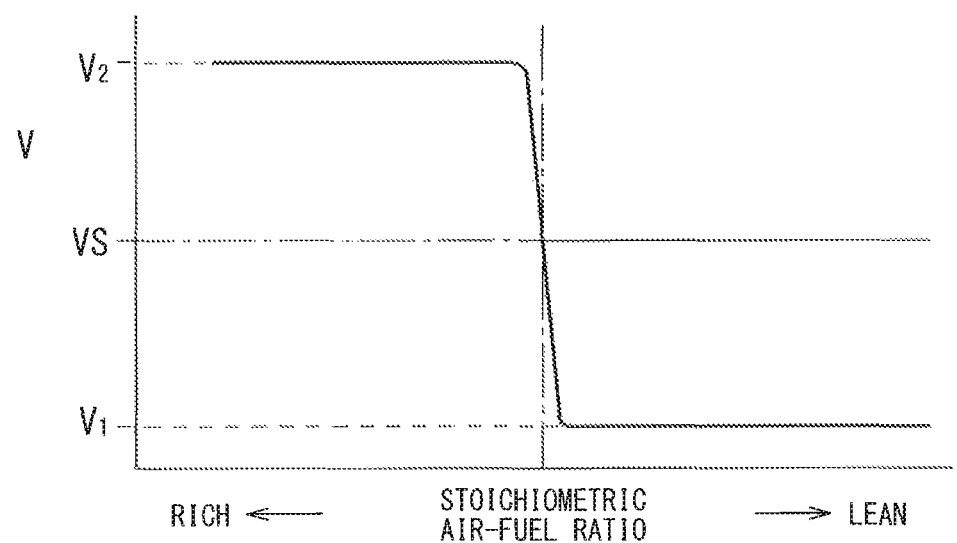

FIG. 19A shows the relationship between an output current I of a limiting current type air-fuel ratio sensor and the air-fuel ratio of the exhaust gas. As shown in FIG. 19A, the output current I of this limiting current type air-fuel ratio sensor increases as the air-fuel ratio of the exhaust gas becomes larger. Note that, in actuality, the change of this output current I is taken into the electronic control unit 30 in the form of a change of voltage from the air-fuel ratio sensor 23. On the other hand, FIG. 19B shows the relationship between the output voltage V of the air-fuel ratio sensor, which is referred to as the "oxygen concentration sensor", and the air-fuel ratio of the exhaust gas. As shown in FIG. 19B, the output voltage V of this air-fuel ratio sensor 23 becomes a 0.1 (V) or so low voltage $V_1$ if the air-fuel ratio of the exhaust gas becomes larger than the stoichiometric air-fuel ratio and becomes a 0.9 (V) or so high voltage $V_2$ if the air-fuel ratio of the exhaust gas becomes smaller than the stoichiometric air-fuel ratio.

Figure 20:
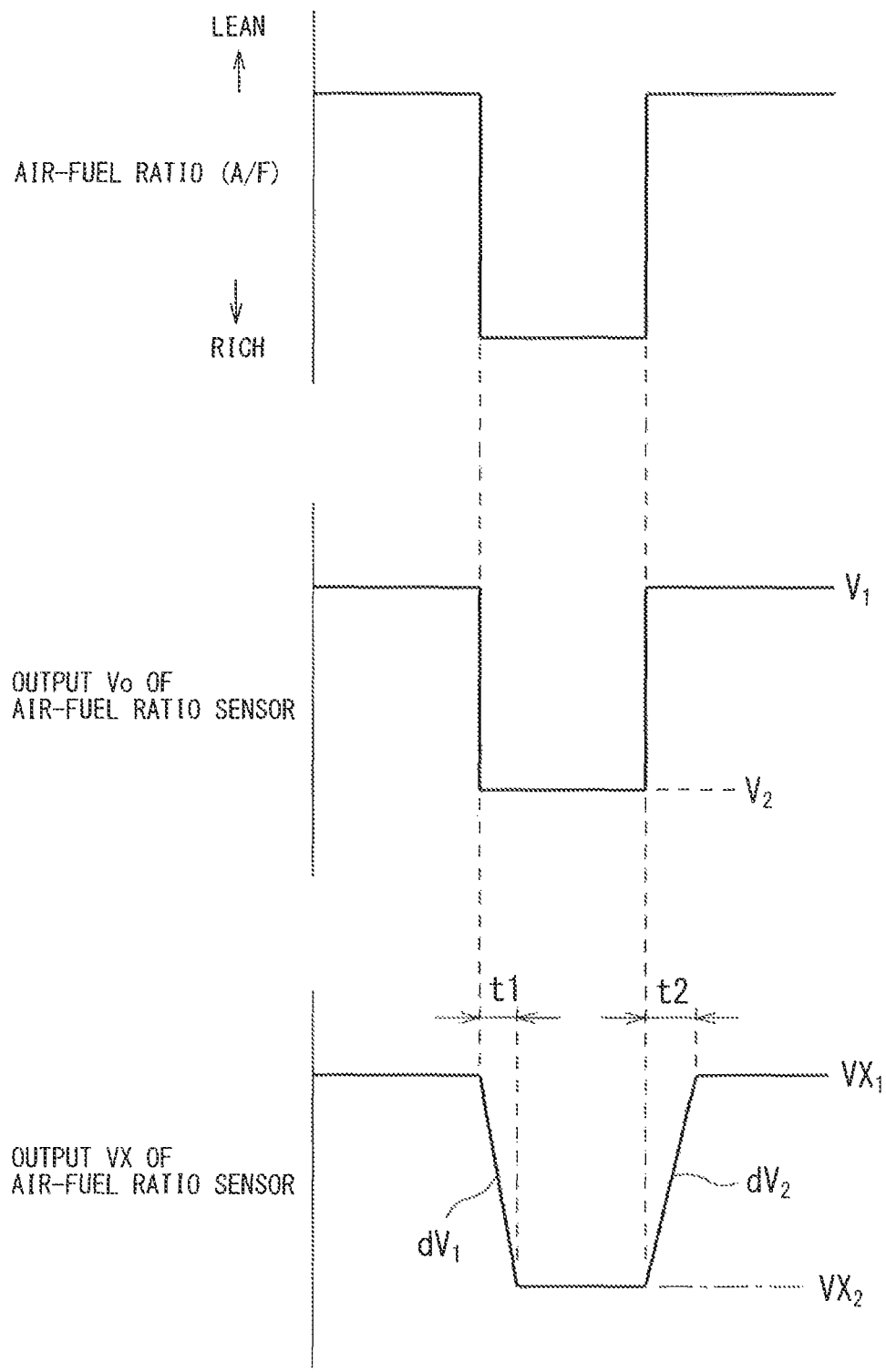
FIG. 20 is a view which shows a change in the output value of an air-fuel ratio sensor.

FIG. 20 shows a change of the output voltage of the air-fuel ratio sensor 23 when using an air-fuel ratio sensor 23 constituted by a limiting current type air-fuel ratio sensor which has an output characteristic shown in FIG. 19A and when making the air-fuel ratio (A/F) of the exhaust gas which flows into the exhaust purification catalyst 13 instantaneously change. Note that, in FIG. 20, $V_o$ shows the change in the output voltage of the air-fuel ratio sensor 23 when deposition of particulate does not cause clogging at the particulate deposition region CL of the upstream side end face of the exhaust purification catalyst 13, while VX snows the change of the output voltage of the air-fuel ratio sensor 23 when deposition of particulate causes clogging in the particulate deposition region CL of the upstream side end face of the exhaust purification catalyst 13.

From FIG. 20, it will be understood that when deposition of particulate does not cause clogging at the particulate deposition region CL of the upstream side end face of the exhaust purification catalyst 13, if the air-fuel ratio of the exhaust gas which flows into the exhaust purification catalyst 13 is made to instantaneously change, the output voltage Vo of the air-fuel ratio sensor 23 also instantaneously change, while when deposition of particulate causes clogging at the particulate deposition region CL of the upstream side end face of the exhaust purification catalyst 13, if the air-fuel ratio of the exhaust gas which flows into the exhaust purification catalyst 13 is made to instantaneously change, the output voltage VX of the air-fuel ratio sensor 23 changers by a slow speed with a delay from the instantaneous change of the air-fuel ratio of the exhaust gas which flows into the exhaust purification catalyst 13. When deposition of particulate causes clogging at the particulate deposition region CL of the upstream side end face of the exhaust purification catalyst 13, the speeds of change $dV_1$, $dV_2$ of the output voltage VX of the air-fuel ratio sensor 23 become slower in this way because the flow rate of the exhaust gas which flows cut toward the air-fuel ratio sensor 23 from the exhaust purification catalyst 13 decreases as shown by GB of FIG. 18.

That is, if deposition of particulate starts to cause clogging at the particulate deposition region CL of the upstream side end face of the exhaust purification catalyst 13 and the flow rate of the exhaust gas which flows through the inside of the exhaust purification catalyst 13 downstream of the particulate deposition region CL of the upstream side end face of the exhaust purification catalyst 13 decreases, time is required until the exhaust gas with the changed air-fuel ratio flows out from the downstream side end face of the exhaust purification catalyst 13. As a result, as shown in FIG. 20, the speeds of change $dV_1$, $dV_2$ of the output voltage VX of the air-fuel ratio sensor 23 become slower. Further, if the particulate deposition region CL of the upstream side end face of the exhaust purification catalyst 13 becomes completely clogged due to deposition of particulate, the exhaust gas with the changed air-fuel ratio circles around to the air-fuel ratio sensor 23 a while after flowing out from the downstream side end face of the exhaust purification catalyst 13. Therefore, in this case as well, time is required until the exhaust gas with the changed air-fuel ratio reaches the air-fuel ratio sensor 23. As a result, as shown in FIG. 20, the speeds of change $dV_1$, $dV_2$ of the output voltage VX of the air-fuel ratio sensor 23 become slower. Whatever the case, if deposition of particulate causes clogging at the particulate deposition region CL of the upstream side end face of the exhaust purification catalyst 13, the speeds of change $dV_1$, $dV_2$ of the output voltage VX of the air-fuel ratio sensor 23 become slower.

Therefore, in the present invention, when the speeds of change $dV_1$, $dV_2$ of the output voltage VX of the air-fuel ratio sensor 23 fall, it is judged that deposition of particulate causes clogging at the particulate deposition region CL of the upstream side end face of the exhaust purification catalyst 13. That is, in the present invention, the exhaust purification catalyst 13 is arranged in the engine exhaust passage and the hydrocarbon feed valve 15 is arranged in the engine exhaust passage upstream of the exhaust purification catalyst 13. The exhaust purification catalyst 13 is comprised of a straight flow type catalyst which has a plurality of exhaust flow paths which extend in a longitudinal axial direction of the exhaust purification catalyst 13. A limited partial region where deposition of particulate in the exhaust gas may cause clogging at a peripheral portion of an upstream side end face of the exhaust purification catalyst 13 is predicted in advance as a particulate deposition, region CL, and the air-fuel ratio sensor 23 is arranged downstream of the peripheral portion of the downstream side end face of the exhaust purification catalyst in the exhaust gas flow region corresponding to the downstream side of the particulate deposition region CL when viewed along the longitudinal axis of the exhaust purification catalyst 13. When the air-fuel ratio of the exhaust gas which flows into the exhaust purification catalyst 13 is made to instantaneously change, if deposition of particulate in the exhaust gas causes clogging at the particulate deposition region CL at the part around the upstream side end face of the exhaust purification catalyst 13, the speed of change of the output value of the air-fuel ratio sensor 23 falls compared with when deposition of the particulate does rust cause clogging. When it is judged whether deposition of particulate in the exhaust gas causes clogging at the particulate deposition region CL at the part around the upstream side end face of the exhaust purification catalyst, the air-fuel ratio of the exhaust gas which flows info the exhaust purification catalyst 13 is made to instantaneously change, and, when the speed of change of the output value of the air-fuel ratio sensor 23 falls at this time, it is judged that deposition of particulate in the exhaust gas causes clogging at the particulate deposition region CL at the part around the upstream side end face of the exhaust purification catalyst 13.

In this case, the speed of change of the output voltage VX of the air-fuel ratio sensor 23 can be found by calculating the speed of change $dV_1$ of the output voltage VX of the air-fuel ratio sensor 23 when the output voltage VX of the air-fuel ratio sensor 23 changes from $VX_1$ to $VX_2$ at FIG. 20. Further, the speed of change of the output voltage VX of the air-fuel ratio sensor 23 can be found by calculating the speed of change $dV_2$ of the output voltage VX of the air-fuel ratio sensor 23 when the output voltage VX of the air-fuel ratio sensor 23 changes from $VX_2$ to $VX_1$ at FIG. 20. Furthermore, the speed of change of the output voltage VX of the air-fuel ratio sensor 23 can be found by calculating the time t1 until the output voltage VX of the air-fuel ratio sensor 23 changes from $VX_1$ to $VX_2$ at FIG. 20. Further, the speed of change of the output voltage VX of the air-fuel ratio sensor 23 can be found even by calculating the time t2 until the output voltage VX of the air-fuel ratio sensor 23 changes from $VX_2$ to $VX_1$ at FIG. 20.

Figure 21:
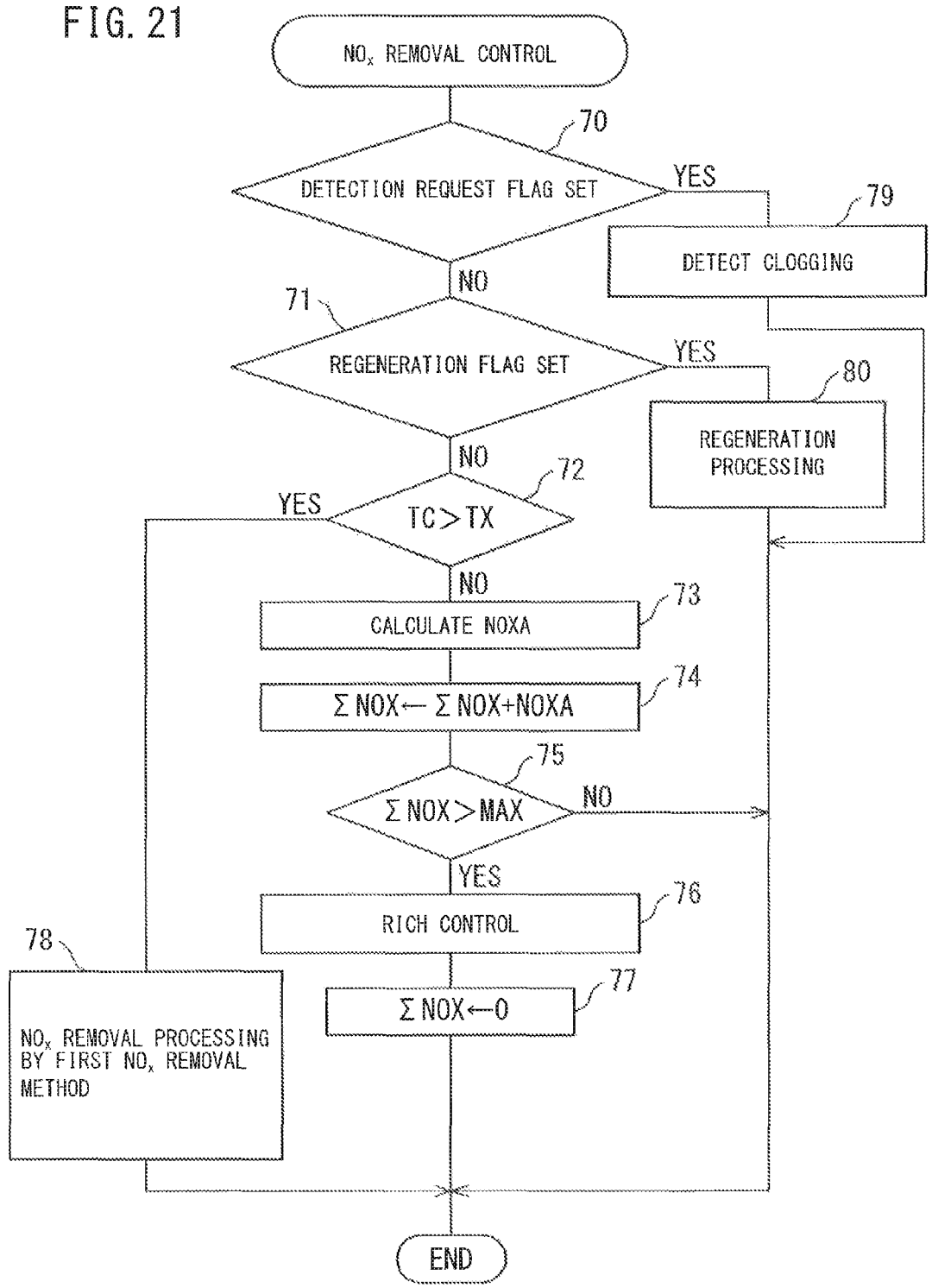
FIG. 21 is a flow chart for performing an $NO_X$ removal control.

That is, when the air-fuel ratio of the exhaust gas which flows into the exhaust purification catalyst 13 is made to instantaneously change, whether the speed of change of the output value of the air-fuel ratio sensor 23 falls can be judged based on any of the time t1 which is required for the fall of output voltage of the air-fuel ratio sensor 23 at this time, the speed of fall $dV_1$ of the output voltage of the air-fuel ratio sensor 23, the time t2 which is required for the rise of output voltage of the air-fuel ratio sensor 23, and the speed of rise $dV_2$ of the output voltage of the air-fuel ratio sensor 23. In this way, the speed of change of the output voltage VX of the air-fuel ratio sensor 23 can be found by various methods, but below the $NO_x$ removal control method according to the present invention will be explained with reference to the example of the case of calculating the time t1 until the output voltage VX of the air-fuel ratio sensor 23 changes from $VX_1$ to $VX_2$ in FIG. 20 to thereby find the speed of change of the output voltage VX of the air-fuel ratio sensor 23. FIG. 21 shows an $NO_x$ removal control routine for performing this $NO_x$ removal control method. This routine is executed by interruption every fixed time interval.

Figure 22:
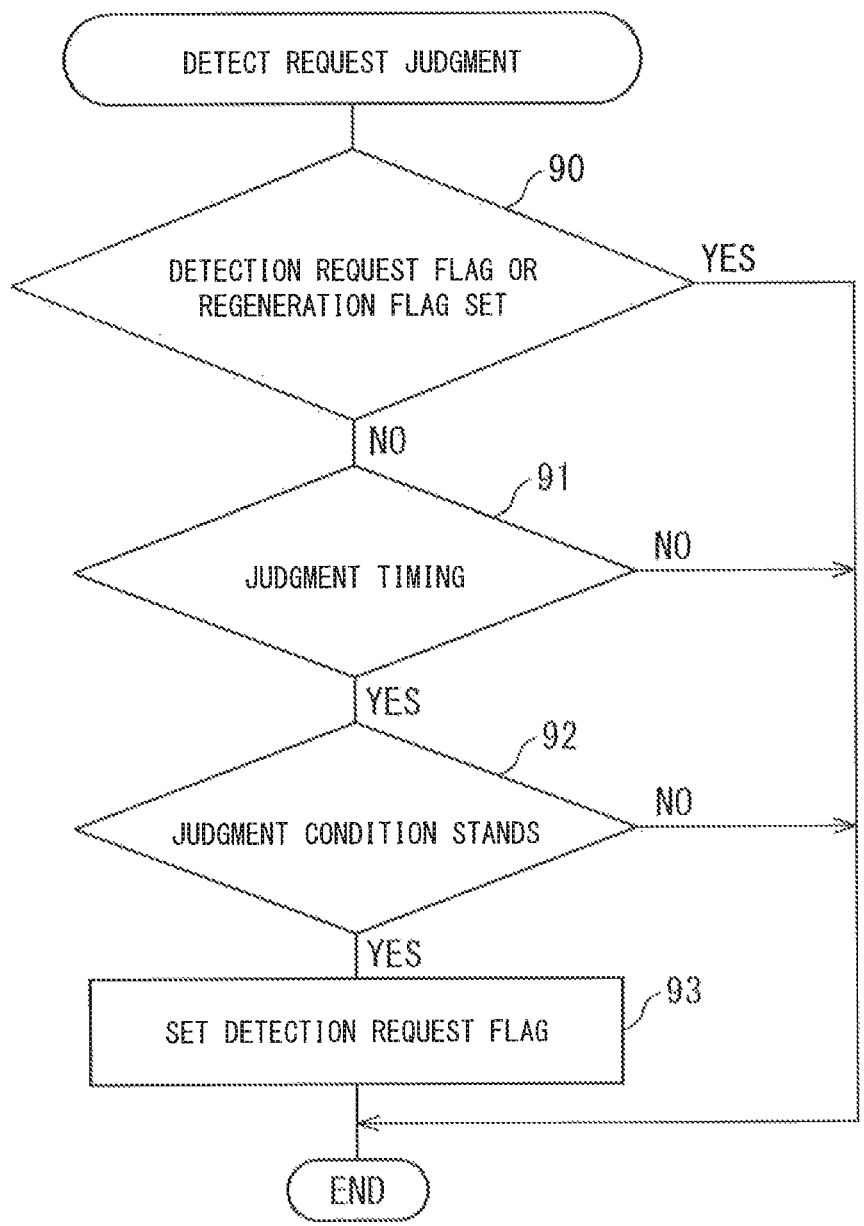
FIG. 22 is a flow chart for performing a detection request judgement.

Referring to FIG. 21, first, at step 70, it is judged if a detection request flag for detecting the presence of clogging due to deposition of particulate is set. This detection request flag is set in the detection request judgment routine which is shown in FIG. 22. When at step 70 it is judged that the detection request flag is not set, the routine proceeds to step 71 where it is judged if a regeneration flag for removing the deposited particulate is set. When at step 71 it is judged that the regeneration flag is not set, the routine proceeds to step 72 where it is judged if the temperature TC of the exhaust purification catalyst 13 which is estimated from the output value of the temperature sensor 24 is higher than the set temperature TX which is shown in FIG. 9. When it is judged that the temperature TC of the exhaust purification catalyst 13 is lower than the set temperature TX which is shown in FIG. 9, it is judged that an $NO_x$ removal action by the second $NO_x$ removal method with the higher $NO_x$ removal rate should be performed and the routine proceeds to step 73 where the $NO_x$ removal action by the second $NO_x$ removal method is performed.

That is, at step 73, the exhaust $NO_x$ amount NOXA per unit time is calculated from the map which is shown in FIG. 13. Next, at step 74, the exhaust $NO_x$ amount NOXA is added to ΣNOX to calculate the stored $NO_x$ amount ΣNOX. Next, at step 75, it is judged if the stored $NO_x$ amount ΣNOX exceeds the allowable value MAX. If ΣNOX>MAX, the routine proceeds to step 76 where the amount of additional fuel WR is calculated from the map which is shown in FIG. 15 and the action of injection of additional fuel is performed. At this time, the air-fuel ratio (A/F) in of the exhaust gas which flows into the exhaust purification catalyst 13 is made rich. Next, at step 77, ΣNOX is cleared.

On the other hand, when at step 72 it is judged that the temperature TC of the exhaust purification catalyst 13 is higher than the set temperature TX which is shown in FIG. 9, the routine proceeds to step 78 where the $NO_x$ removal processing by the first $NO_x$ removal method with the higher $NO_x$ removal rate is performed. At this time, hydrocarbons are injected from the hydrocarbon feed valve 15 in an injection amount WT shown in FIG. 11 by an injection period ΔT which is predetermined corresponding to the engine operating state. In this way, in this embodiment according to the present invention, a first NOX removal method which removes NOX contained in exhaust gas by injecting hydrocarbons from the hydrocarbon feed valve within the predetermined range of period and a second NOX removal method which releases stored $NO_X$ from the exhaust purification catalyst 13 to remove $NO_X$ by making the air-fuel ratio of the exhaust gas flowing into the exhaust purification catalyst 13 rich by a period longer than the predetermined range of period are selectively used.

Figure 23:
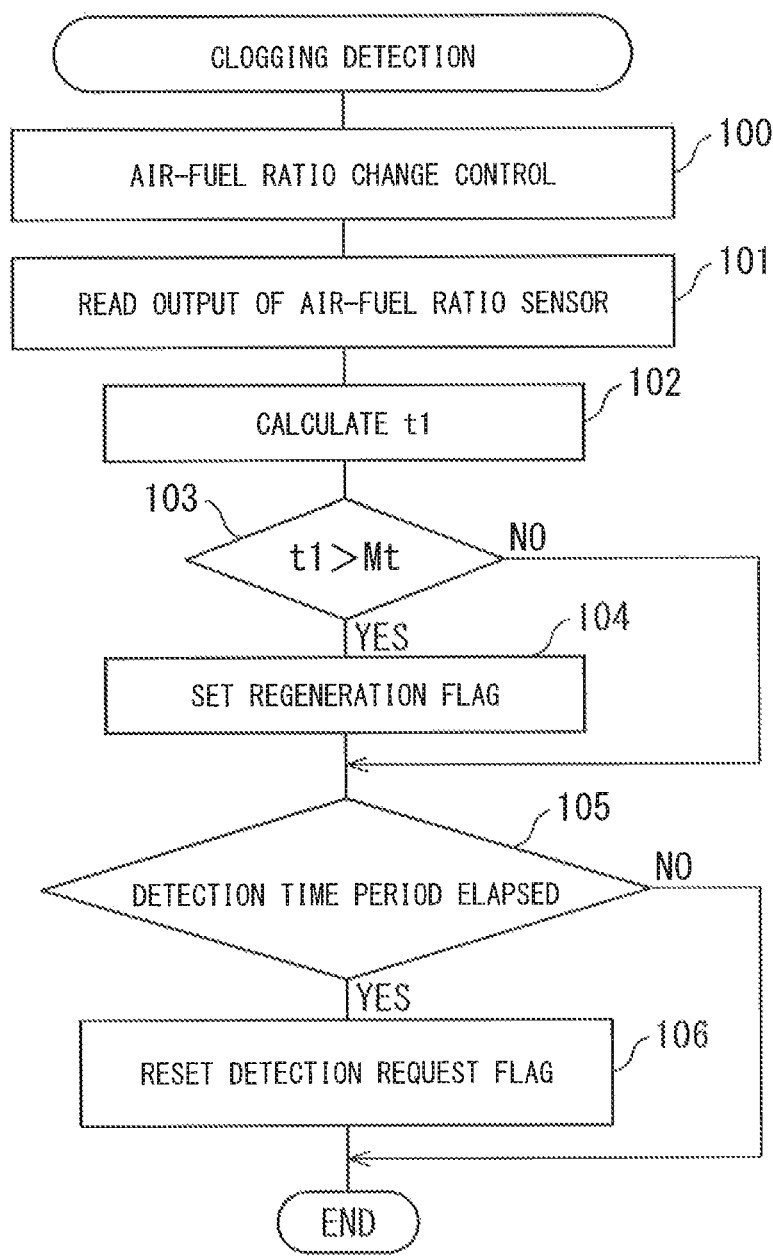
FIG. 23 is a flow chart for detecting a clogging.
Figure 24:
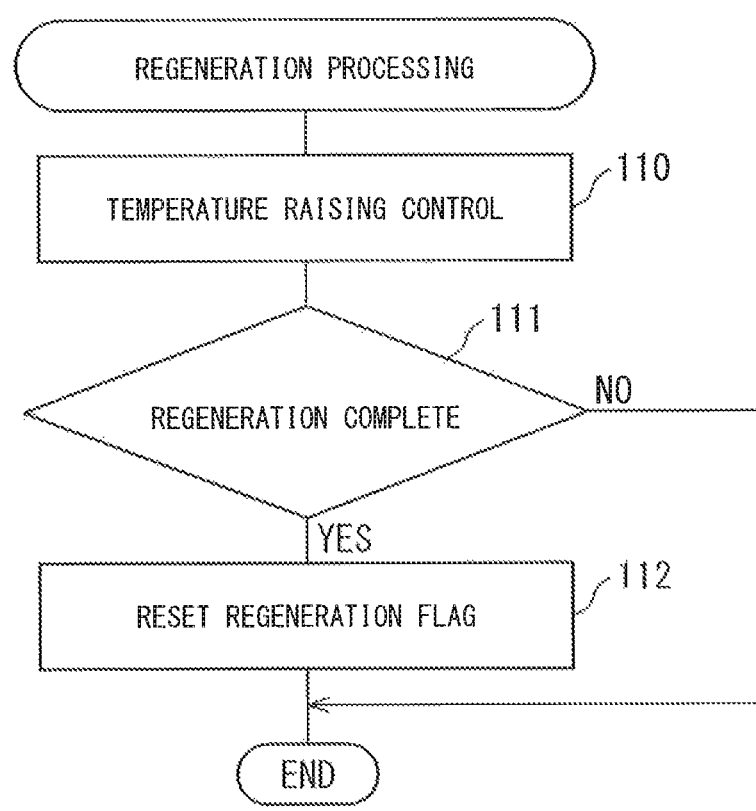
FIG. 24 is a flow chart for performing a regeneration proceeding.

On the other hand, when at step 70 it is judged that the defection request flag is set, the routine proceeds to step 79 where the clogging detection routine for detecting whether deposition of particulate causes clogging is executed. This clogging detection routine is shown in FIG. 23. In this clogging detection routine, when it is judged that deposition of particulate causes clogging, a regeneration flag for removing the deposited particulate is set. If the regeneration flag is set, the routine proceeds from step 71 to step 80 where regeneration processing for removing the deposited particulate is performed. The regeneration, processing routine for performing this regeneration processing is shown in FIG. 24.

Next, the detection request judgment routine for judging whether there is a request for detection of deposition of particulate causing clogging will be explained with reference to FIG. 22. This routine is executed by interruption every fixed time interval. Referring to FIG. 22, first, at step 90, it is judged if the detection request flag or the regeneration flag is set. When the defection request flag or the regeneration flag is set, the processing cycle is ended. As opposed to this, when it is judged that neither of the detection request flag and the regeneration flag is set, the routine proceeds to step 91 where it is judged if the timing has become the judgment timing for judging if deposition of particulate causes clogging. For example, it is judged that the timing has become the judgment timing when the driving distance of the vehicle exceeds a fixed distance after it was judged if deposition of particulate causes clogging the previous time.

When at step 91 it is judged that the timing has become the judgment timing, the routine proceeds to step 92 where it is judged if a judgment condition stands for judging whether deposition of particulate causes clogging. For example, when the engine is operating steadily in a predetermined operating state, it is judged that a judgment condition stands for judging whether deposition of particulate causes clogging. When at step 92 it is judged that the judgment condition stands, the routine proceeds to step 93 where the detection request flag is set. If the detection request flag is set, at FIG. 21, the routine proceeds from step 70 to step 79 where the clogging detection routine which is shown in FIG. 23 for detecting if deposition of particulate causes clogging is performed.

Referring to FIG. 23, first, at step 100, an air-fuel ratio change control by which the air-fuel ratio of the exhaust gas flowing into the exhaust purification catalyst 13 is made to instantaneously change is performed. At this time, in this embodiment according to the present invention, as shown in FIG. 20, additional fuel is fed into the combustion chamber 2 or hydrocarbons are injected from the hydrocarbon feed valve 15 to thereby make the air-fuel ratio (A/F) of the exhaust gas which flows into the exhaust purification catalyst 13 temporarily change to the rich side. Next, at step 101, the output voltage VX of the air-fuel ratio sensor 23 is read. Next, at step 102, the time t1 which is required for the output voltage VX of the air-fuel ratio sensor 23 to change from $VX_1$ to $VX_2$ in FIG. 20 is calculated. Next, at step 103, it is judged whether the time t1 exceeds a predetermined reference time Mt.

When at step 103 it is judged that the time t1 does not exceed the predetermined reference time Mt, it is judged that deposition of particulate does not cause clogging. At this time, the routine jumps to step 105. As opposed to this, when at step 103 it is judged that the time t1 exceeds the predetermined reference time Mt, it is judged that deposition of particulate causes clogging, then the routine proceeds to step 104 where the regeneration flag for removing the deposited particulate is set. Next, the routine proceeds to step 105. At step 105, it is judged if a predetermined detection time period for detecting if deposition of particulate causes clogging has elapsed. When the predetermined detection time period has elapsed, the routine proceeds from step 105 to step 106 where the detection request flag is reset. If the detection request flag is reset, in FIG. 21, the routine proceeds from step 70 to step 71, while if the regeneration flag is set at this time, the routine proceeds to step 80 where the regeneration processing which is shown in FIG. 24 is performed for removing the deposited particulate.

Referring to FIG. 24, first, at step 110, a temperature raising control for raising the temperature of the upstream side end face of the exhaust purification catalyst 13 under a lean air-fuel ratio and then maintaining the temperature of the upstream side end face of the exhaust purification catalyst 13 at 500° C. or more, preferably 600° C. or more, is performed. This temperature raising control is performed by feeding the combustion chamber 2 additional fuel or by injecting hydrocarbons from the hydrocarbon feed valve 15. Next, at step 111, it is judged whether the deposited particulate has been removed, that is, whether processing for regeneration of the upstream side end face of the exhaust purification catalyst 13 has been completed. When the processing for regeneration of the upstream side end face of the exhaust purification catalyst 13 has been completed, the routine proceeds to step 112 where the regeneration flag is reset.

Figure 25:
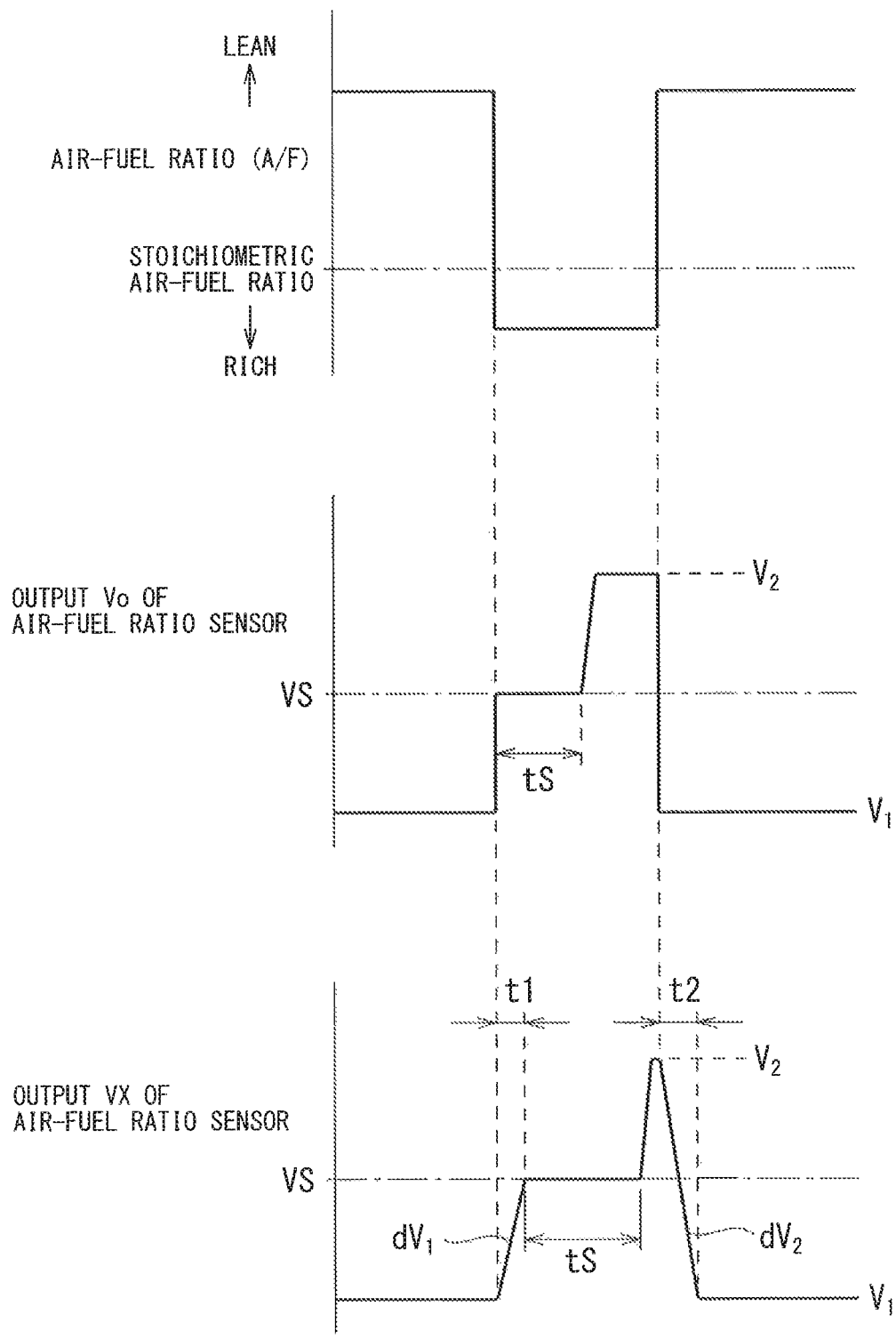
FIG. 25 is a view which shows a change in the output value of an air-fuel ratio sensor.

FIG. 25 to FIG. 28 show another embodiment in the case of using an air-fuel ratio sensor 23 constituted by an air-fuel ratio sensor which has the output characteristic shown in FIG. 19B. FIG. 25 shows the change in the output voltage of the air-fuel ratio sensor 23 when making the air-fuel ratio (A/F) of the exhaust gas which flows into the exhaust purification catalyst 13 temporarily change from lean to rich in this case. Note that, in FIG. 25, $V_o$ shows the change in the output ratio of the air-fuel ratio sensor 23 when clogging goes not occur due to deposition of particulate in the particulate deposition region CL on the upstream side end face of the exhaust purification catalyst 13, while VX shows the change in the output ratio of the air-fuel ratio sensor 23 when clogging occurs due to deposition of particulate in the particulate deposition region CL on the upstream side end face of the exhaust purification catalyst 13.

As shown in FIG. 25, when deposition of particulate does not cause clogging in the particulate deposition region CL on the upstream side end race of the exhaust purification catalyst 13, if the air-fuel ratio of the exhaust gas which flows into the exhaust purification catalyst 13 is made to change instantaneously from lean to rich, the output voltage Vo of the air-fuel ratio sensor 23 instantaneously rises from $V_1$ to VS then, next, the output voltage Vo of the air-fuel ratio sensor 23 is maintained at VS. This VS shows the output voltage V of the air-fuel ratio sensor 23 when, as shown in FIG. 19B, the air-fuel ratio of the exhaust gas is the stoichiometric air-fuel ratio. That is, when the exhaust purification catalyst 13 has an oxygen storage ability, if the air-fuel ratio of the exhaust gas which flows into the exhaust purification catalyst 13 is made to change from lean to rich, the air-fuel ratio of the exhaust gas which flows out from the exhaust purification catalyst 13 is maintained at the stoichiometric air-fuel ratio until the oxygen which is stored in the exhaust purification catalyst 13 is consumed. Therefore, as shown in FIG. 25, if the air-fuel ratio of the exhaust gas which flows into the exhaust purification catalyst 13 is made to change from lean to rich, the output voltage Vo of the air-fuel ratio sensor 23 is maintained at VS until the oxygen which is stored in the exhaust purification catalyst 13 is consumed, that is, during the time tS. Next, the output voltage Vo of the air-fuel ratio sensor 23 rises up to $V_2$.

On the other hand, it will be understood, that when deposition of particulate causes clogging at the particulate deposition region CL of the upstream side end face of the exhaust purification catalyst 13, if the air-fuel ratio of the exhaust gas which flows into the exhaust purification catalyst 13 is made to change from lean to rich, the output voltage VX of the air-fuel ratio sensor 23 rises by a slow speed $dV_1$ with a delay from the instantaneous change of the air-fuel ratio of the exhaust gas which flows into the exhaust purification catalyst 13 while if the air-fuel ratio of the exhaust gas which flows into the exhaust purification catalyst 13 is made to change from rich to lean, the output voltage VX of the air-fuel ratio sensor 23 falls by a slow speed $dV_2$ with a delay from the instantaneous change of the air-fuel ratio of the exhaust gas which flows into the exhaust purification catalyst 13.

Further, when deposition of particulate causes clogging at the particulate deposition region CL of the upstream side end face of the exhaust purification catalyst 13, when the air-fuel ratio of the exhaust gas which flows into the exhaust purification catalyst 13 is temporarily switched from lean to rich, the time t1 which is required for the output voltage VX of the air-fuel ratio sensor 23 to rise from $V_1$ to VS and the time t2 which is required for the output voltage VX of the air-fuel ratio sensor 23 to fall from $V_2$ to $V_1$ increase. When the deposition of particulate causes clogging at the particulate deposition region CL of the upstream side end face of the exhaust purification catalyst 13, in this way the speeds of change $dV_1$, $dV_2$ of the output voltage VX of the air-fuel ratio sensor 23 become slower and the times t1, t2 increase due to, as explained above, the flow rate of the exhaust gas which flows out toward the air-fuel ratio sensor 23 from the exhaust purification catalyst 13 decreasing as shown by GB of FIG. 18.

Therefore, in a first example according to the present invention, when the speeds of change $dV_1$, $dV_2$ of the output voltage VX of the air-fuel ratio sensor 23 fall or when the times t1, t2 increase, it is judged that deposition of particulate causes clogging at the particulate deposition region CL of the upstream side end face of the exhaust purification catalyst 13.

Further, when deposition of particulate causes clogging at the particulate deposition region CL of the upstream side end face of the exhaust purification catalyst 13, as shown in FIG. 25, when the air-fuel ratio of the exhaust gas which flows into the exhaust purification catalyst 13 is made to change from lean to rich, the time tS during which the output voltage VX of the air-fuel ratio sensor 23 is maintained at VS increases. That is, at this time, the amount of flow of the exhaust gas which flows out toward the air-fuel ratio sensor 23 from the exhaust purification catalyst 13 decreases, so time is required for consuming the stored oxygen. As a result, the time tS during which the output voltage VX of the air-fuel ratio sensor 23 is maintained at VS increases. Therefore, in this case, when the time tS during which the output voltage VX of line air-fuel ratio sensor 23 is maintained at VS increases, it can be judged that deposition of particulate causes clogging at the particulate deposition region CL of the upstream side end face of the exhaust purification catalyst 13.

Note that, if the exhaust purification catalyst 13 deteriorates, the oxygen storage ability falls. As a result, the time tS during which the output voltage VX of the air-fuel ratio sensor 23 is maintained at VS decreases. That is, when, the exhaust purification catalyst 13 deteriorates, the time tS during which the output voltage VX of the air-fuel ratio sensor 23 is maintained at VS does not increase. The time tS during which the output voltage VX of the air-fuel ratio sensor 23 is maintained at VS increases when deposition of particulate causes clogging at the particulate deposition region CL of the upstream side end face. Therefore, it is possible to reliably detect when deposition of particulate causes clogging at the particulate deposition region CL of the upstream side end face of the exhaust purification catalyst 13 from the change of the time tS during which the output voltage VX of the air-fuel ratio sensor 23 is maintained at VS.

Therefore, in the second example according to the present invention, when the speeds of change $dV_1$, $dV_2$ of the output voltage VX of the air-fuel ratio sensor 23 fall or the times t1, t2 increase and the time tS during which the output voltage VX of the air-fuel ratio sensor 23 is maintained at VS increases, it is judged if deposition of particulate causes clogging at the particulate deposition region CL of the upstream side end face of the exhaust purification catalyst 13.

Figure 26:
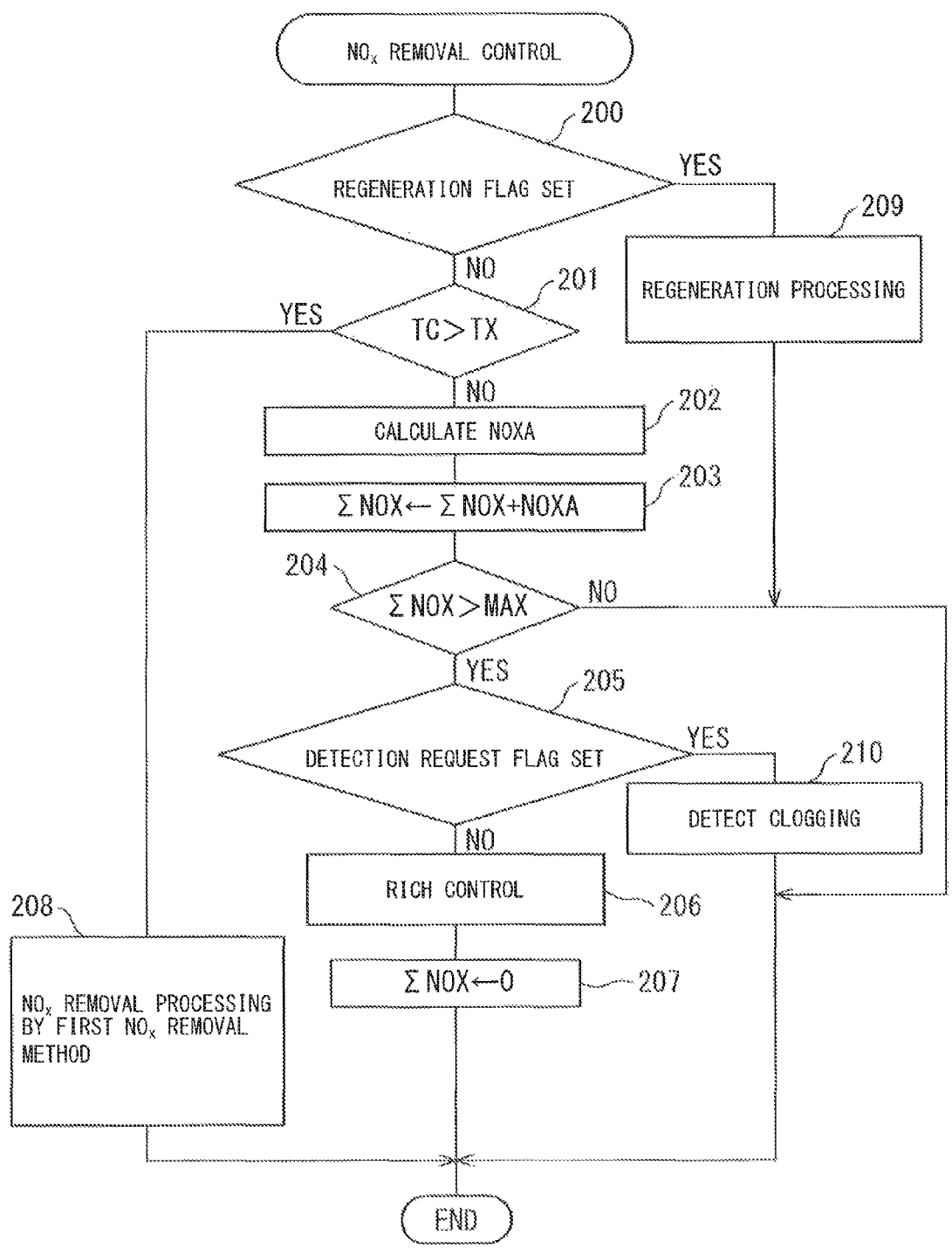
FIG. 26 is a flow chart for performing an $NO_X$ removal, control.

Next, another $NO_x$ removal control method according to the present invention will be explained with reference to the example of the case of using as the air-fuel ratio sensor 23 an air-fuel ratio sensor which has the output characteristic shown in FIG. 19B and calculating the time t1 until the output voltage VX of the air-fuel ratio sensor 23 changes from $V_1$ to VS in FIG. 25 so as to find the speed of change of the output voltage VX of the air-fuel ratio sensor 23. Note that, in this other $NO_x$ removal control method, it is judged whether deposition of particulate in the exhaust gas causes clogging at the particulate deposition region CL at the peripheral portion of the upstream side end face of the exhaust purification catalyst 13 when the air-fuel ratio of the exhaust gas which flows in to the exhaust purification catalyst 13 is made rich to release $NO_x$ from the exhaust purification catalyst 13. FIG. 26 shows the $NO_x$ removal control routine for wording this $NO_x$ removal control method. This routine is executed by interruption every fixed time interval.

Referring to FIG. 26, first, at step 200, it is judged if the regeneration flag for removing the deposited particulate is set. When it is judged that the regeneration flag is not set, the routine proceeds to step 201 where it is judged if the temperature TC of the exhaust purification catalyst 13 which is estimated from the output value of the temperature sensor 24 is higher than the set temperature TX shown in FIG. 9. When it is judged that the temperature TC of the exhaust purification catalyst 13 is lower than the set temperature TX shown in FIG. 9, it is judged that an $NO_x$ removal action by the second $NO_x$ removal method with a higher $NO_x$ removal rate should be performed, then the routine proceeds to step 202 where the $NO_x$ removal action by the second $NO_x$ removal method is performed.

That is, at step 202, the exhaust $NO_x$ amount NOXA per unit time is calculated from the map which is shown in FIG. 13. Next, at step 203, the exhaust $NO_x$ amount NOXA is added to the ΣNOX whereby the stored $NO_x$ amount ΣNOX is calculated. Next, at step 204, it is judged if the stored $NO_x$ amount ΣNOX exceeds the allowable value MAX. When ΣNOX>MAX, the routine proceeds to step 205 where it is judged if the detection request flag for detecting deposition of particulate causing clogging is set. This detection request flag is set in the detection request judgment routine which is shown in the already explained FIG. 22. When at step 205 it is judged that the detection request flag is not set, the routine proceeds to step 206 where the amount of additional fuel WR is calculated from the map which is shown in FIG. 15 and the action for injecting additional fuel is performed. At this time, the air-fuel ratio (A/F) in of the exhaust gas which flows into the exhaust purification catalyst 13 is made rich. Next, at step 207, ΣNOX is cleared.

On the other hand, when at step 201 it is judged if the temperature TC of the exhaust purification catalyst 13 is higher than the set temperature TX shown in FIG. 9, the routine proceeds to step 205 where the $NO_x$ removal processing by the first $NO_x$ removal method with the higher $NO_x$ removal rate is performed. At this time, hydrocarbons are injected from the hydrocarbon feed valve 15 in an injection amount WT shown in FIG. 11 by an injection period ΔT which is predetermined corresponding to the engine operating state. In this way, in this embodiment as well, a first NOX removal method which removes NOX contained in exhaust gas by injecting hydrocarbons from the hydrocarbon feed valve within the predetermined range or period and a second NOX removal method which releases stored $NO_X$ from the exhaust purification catalyst 13 to remove $NO_X$ by making the air-fuel ratio of tire exhaust gas flowing into the exhaust purification catalyst 13 rich by a period longer than the predetermined range of period are selectively used.

Figure 27:
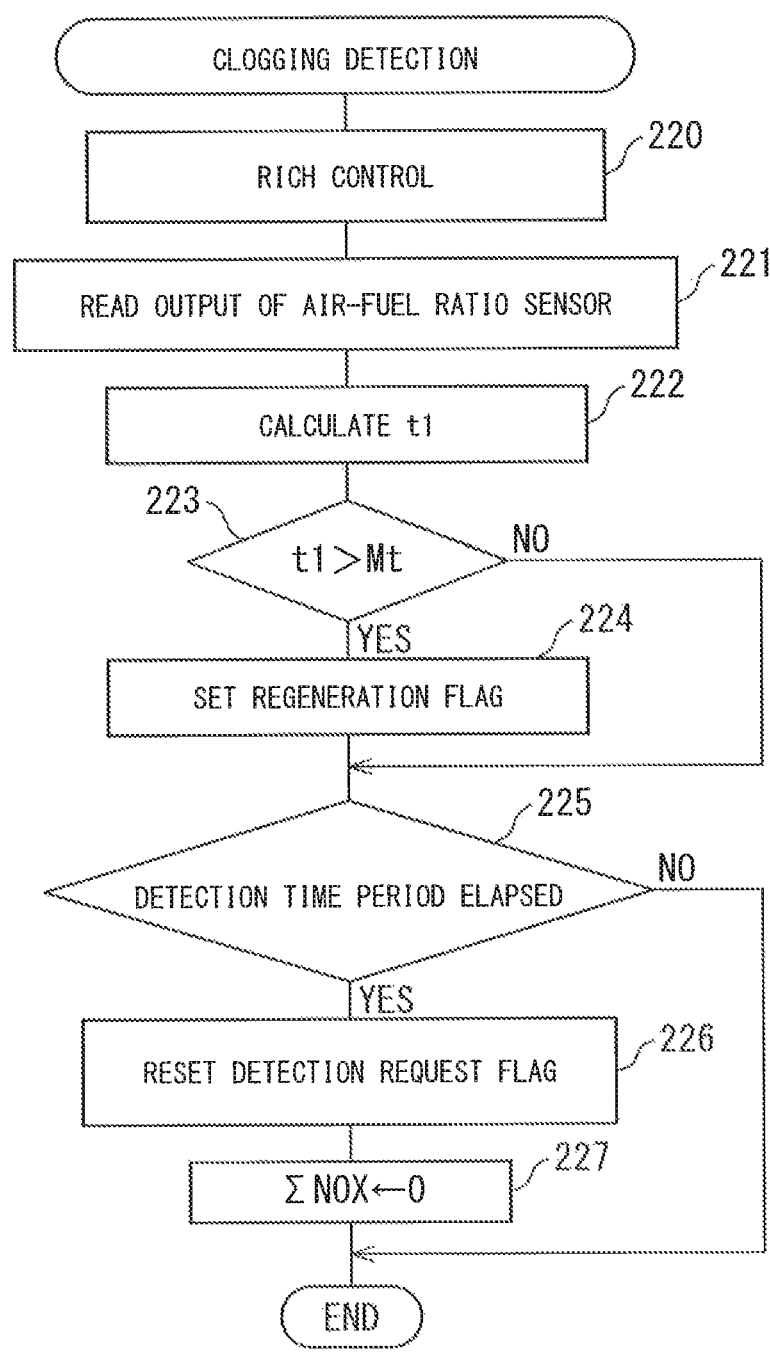
FIG. 27 is a flow chart for detecting a clogging.

On the other hand, when at step 205 it is judged that the detection request flag is set, the routine proceeds to step 210 where a clogging detection routine is executed for detecting if deposition of particulate causes clogging. A first example of this clogging detection routine is shown in FIG. 27. In this clogging detection routine, when it is judged that deposition of particulate causes clogging, the regeneration flag for removal of the deposited particulate is set. If the regeneration flag is set, the routine proceeds from step 200 to step 209 where regeneration processing for removing the deposited particulate is performed. The regeneration processing routine for performing this regeneration processing is shown in the already explained FIG. 24.

FIG. 27 shows a first example of the clogging detection routine which is performed at step 210 when it is judged at step 205 of FIG. 26 that the detection request flag is set. Referring to FIG. 27, first, at step 220, rich control for making the air-fuel ratio of the exhaust gas which flows into the exhaust purification catalyst 13 rich is performed. That is, the amount of additional fuel WR is calculated from the map which is shown in FIG. 15 and the action of injection of additional fuel is performed. At this time, the air-fuel ratio of the exhaust gas which is exhausted from the combustion chamber 2 is made rich and the air-fuel ratio (A/F) in of the exhaust gas which flows into the exhaust purification catalyst 13 is made rich. Next, at step 221, the output voltage V of the air-fuel ratio sensor 23 is read. Next, at step 222, the time t1 which is required for the output voltage VX of the air-fuel ratio sensor 23 to change from $V_1$ to VS at FIG. 25 is calculated. Next, at step 223, it is judged if the time t1 exceeds the predetermined reference time Mt.

When at step 223 it is judged that the time t1 does not exceed the predetermined reference time Mt, it is judged that deposition of particulate does not cause clogging. At this time, the routine jumps to step 225. As opposed to this, when as step 223 it is judged that the time t1 exceeds the predetermined reference time Mt, it is judged that deposition of particulate causes clogging, then the routine proceeds to step 224 where the regeneration flag for removing the deposited particulate is set. Next, the routine proceeds to step 225. At step 225, it is judged if a predetermined detection time period for detecting if deposition of particulate causes clogging has elapsed. When the predetermined detection time period has elapsed, the routine proceeds from step 225 to step 226 where the detection request flag is reset. Next, at step 227, ΣNOX is cleared.

Figure 28:
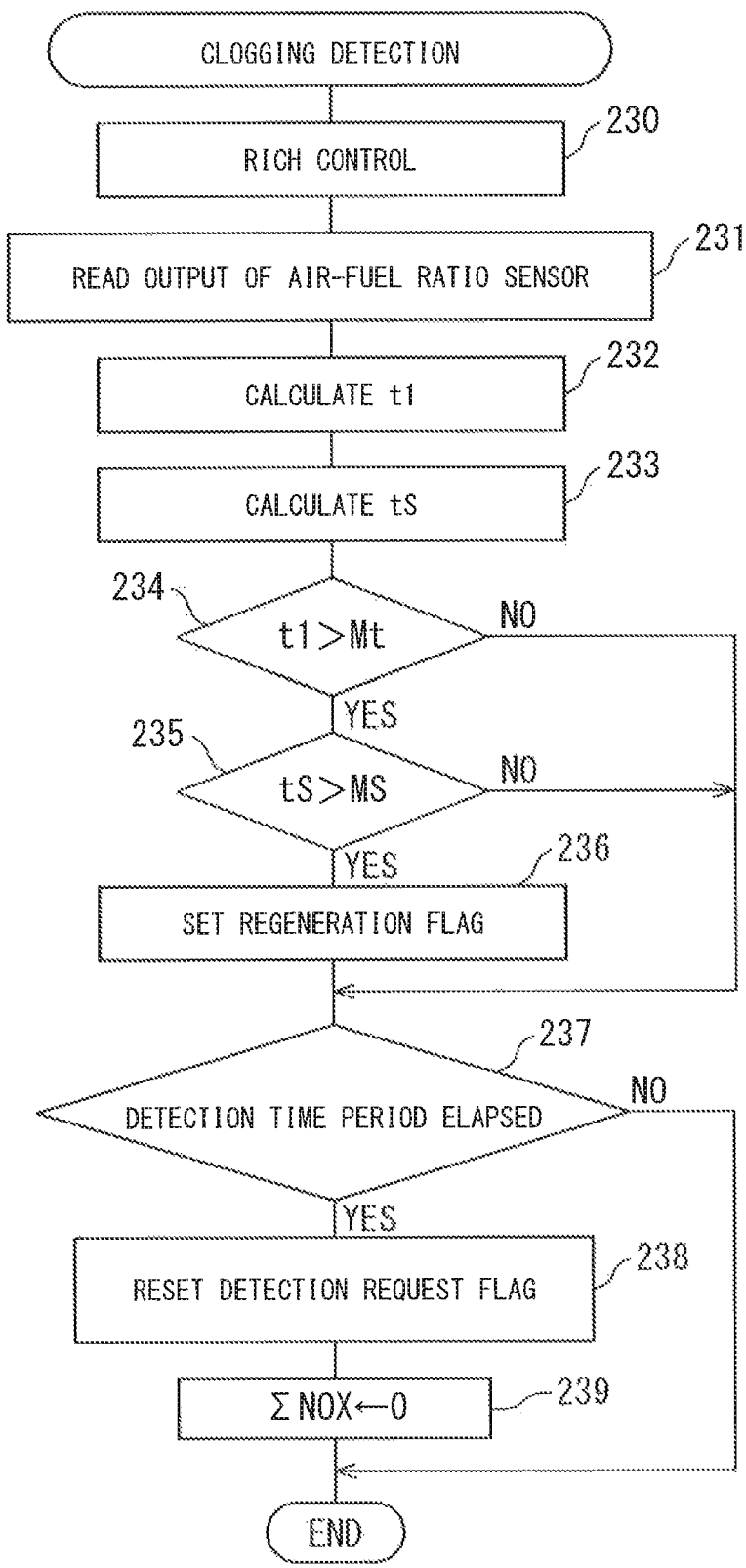
FIG. 28 is a flow chart for detecting a clogging.

FIG. 28 shows a second example of a clogging detection routine which is performed at step 210 when it is judged at step 205 of FIG. 26 that the detection request flag is set. Referring to FIG. 28, first, at step 230, rich control for making the air-fuel ratio of the exhaust gas which flows into the exhaust purification catalyst 13 rich is performed. That is, the amount of additional fuel WR is calculated from the map which is shown in FIG. 15 and the action of injecting additional fuel is performed. At this time, the air-fuel ratio (A/F) in of the exhaust gas which flows into the exhaust purification catalyst 13 is made rich. Next, at step 231, the output voltage V of the air-fuel ratio sensor 23 is read. Next, act step 232, the time t1 which is required for the output voltage VX of the air-fuel ratio sensor 23 to change from $V_1$ to VS at FIG. 25 is calculated. Next, at step 233, the time tS during which the output voltage VX of the air-fuel ratio sensor 23 is maintained at VS is calculated.

Next, at step 234, it is judged if the time t1 exceeds the predetermined reference time Mt. When at step 234 it is judged that the time t1 does not exceed the predetermined reference time Mt, it is judged that deposition of particulate does not cause clogging. At this time, the routine jumps to step 237. As opposed to this, when at step 234 it is judged that the time t1 exceeds the predetermined reference time Mt, the routine proceeds to step 235 where it is judged if the time tS exceeds the predetermined reference time MS. When at step 235 it is judged that the time tS does not exceed the predetermined reference time MS, it is judged that deposition of particulate does not cause clogging. At this time, the routine jumps to step 237.

As opposed to this, when at step 235 it is judged that the time tS exceeds the predetermined reference time MS, it is judged that the deposition of particulate causes clogging, then the routine proceeds to step 236 where the regeneration flag for removing the deposited particulate is set. Next, the routine proceeds to step 237. At step 237, it is judged if the predetermined detection time period for detecting if deposition of particulate causes clogging has elapsed. When the predetermined detection time period has elapsed, the routine proceeds from step 237 to step 238 where the detection request flag is reset. Next, at step 239, ΣNOX is cleared.

Figure 29:
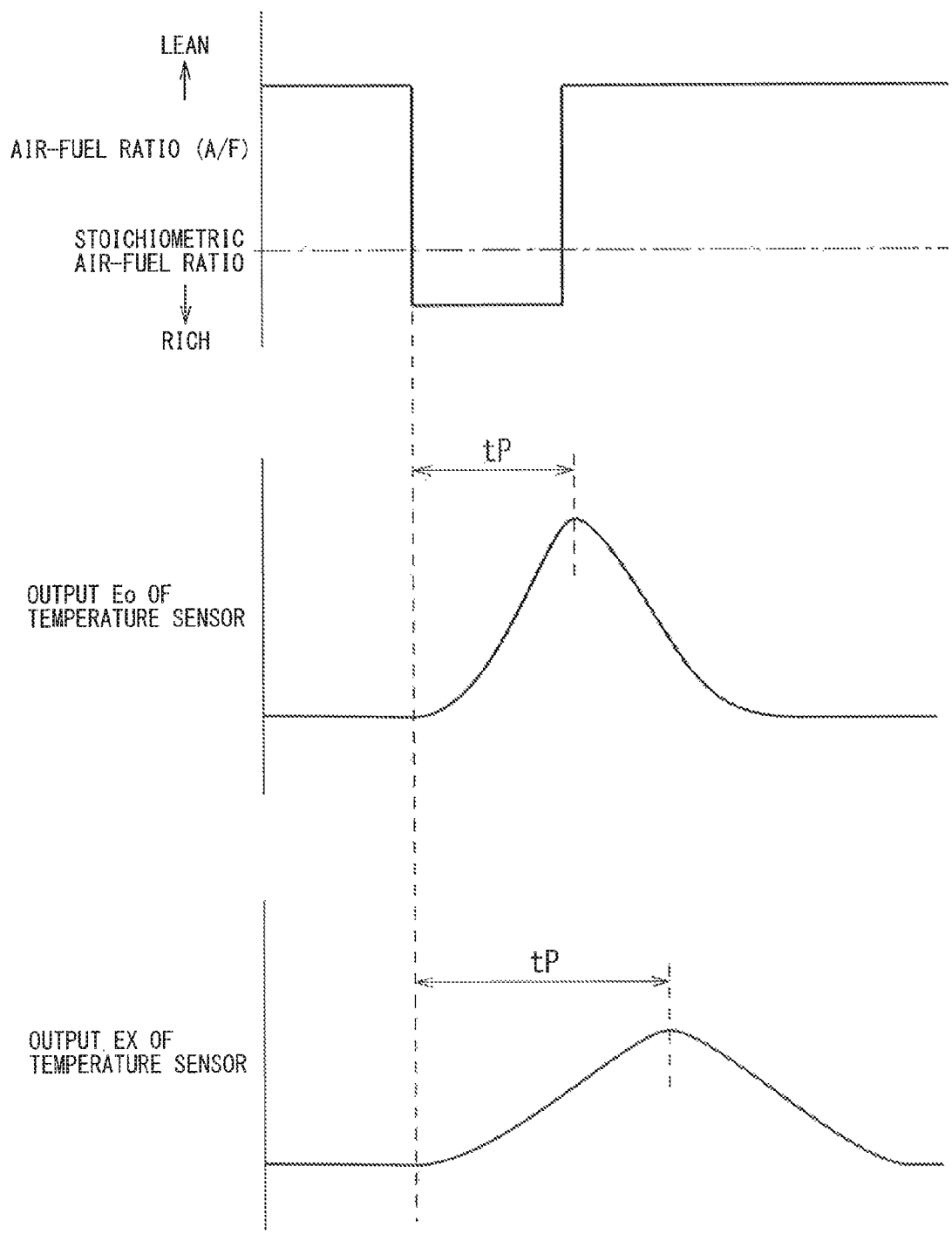
FIG. 29 is a view which shows a change in the output value of a temperature sensor.

FIG. 29 to FIG. 33 show still another embodiment which uses both the air-fuel ratio sensor 23 and the temperature sensor 24 to judge if deposition of particulate causes clogging at the particulate deposition region CL of the upstream side end face of the exhaust purification catalyst 13. FIG. 29 shows the change in the output voltage of the temperature sensor 24 when making the air-fuel ratio (A/F) of the exhaust gas which flows into the exhaust purification catalyst 13 temporarily change from lean to rich in this case. Note that, in FIG. 29, $E_o$ indicates the change in the output voltage of the temperature sensor 24 when deposition of particulate does not cause clogging at the particulate deposition region CL of the upstream side end face of the exhaust purification catalyst 13, while EX indicates the change in the output voltage of the temperature sensor 24 when deposition of particulate causes clogging at the particulate deposition region CL of the upstream side end face of the exhaust purification catalyst 13.

If the air-fuel ratio of the exhaust gas which flows into the exhaust purification catalyst 13 is made to change from lean to rich, the amounts of the HC, CO, or other reduction components in the exhaust gas increase. The heat of oxidation reaction of the increased HC, CO, or other reduction components causes, as shown in FIG. 29, the temperature of the exhaust gas which flows out from the exhaust purification catalyst 13 to temporarily increase. Note that, in FIG. 29, tP indicates the time until the temperature of the exhaust gas which flows out from the exhaust purification catalyst 13 peaks after the air-fuel ratio of the exhaust gas which flows into the exhaust purification catalyst 13 is made to change from lean to rich.

Now, as shown in FIG. 16A to FIG. 17B, the temperature sensor 24 is arranged downstream of the peripheral portion of the downstream side end face of the exhaust purification catalyst 13 in the exhaust gas flow region which corresponds to the downstreams side of the particulate deposition region CL when viewed along the longitudinal axis of the exhaust purification catalyst 13. Therefore, if deposition of particulate causes clogging at the particulate deposition region CL of the upstream side end face of the exhaust purification catalyst 13, the oxidation reaction of the HC, CO, or other reduction components in the particulate deposition region CL becomes weaker, so the temperature of the exhaust gas which flows out toward the temperature sensor 24 from the exhaust purification catalyst 13 becomes lower and the amount of flow of the exhaust gas which flows out from the exhaust purification catalyst 13 is decreased. As a result, as will be understood from the change of the output voltage $E_o$ of the temperature sensor 24 of FIG. 29 and the output voltage EX of the temperature sensor 24, when deposition of particulate is causing clogging, the peak value of the temperature of the exhaust gas which flows out from the exhaust purification catalyst 13 becomes lower and the time of change of temperature of the exhaust gas which flows out from the exhaust purification catalyst 13 become longer. Therefore, when deposition of particulate causes clogging, the time tP until the temperature of the exhaust gas which flows out from the exhaust purification catalyst 15 peaks becomes longer.

Therefore, in this case, when it is judged that the time tP exceeds the predetermined reference time MP, it can be judged that deposition of particulate causes clogging. On the other hand, when using the change in the output voltage VX of the air-fuel ratio sensor 23 as the basis to judge if deposition of particulate causes clogging, as explained above, when the time t1 exceeds the predetermined reference time Mt, it can be judged that deposition of particulate causes clogging. However, for example, even when the exhaust purification catalyst 13 deteriorates and the oxidation reaction of the HC, CO, and other reduction components in the exhaust purification catalyst 13 becomes weaker, the time tP until the temperature of the exhaust gas peaks becomes longer. Further, for example, even when a porous cap which covers the detection part of the air-fuel ratio sensor 23 becomes clogged, the time t1 becomes longer. Therefore, even when the time tP exceeds the predetermined reference time MP, sometimes deposition of particulate does not cause clogging. Even when the time t1 exceeds the predetermined reference time Mt as well, sometimes deposition of particulate does not cause clogging.

These are shown in the table of FIG. 30. Note that, in the table of FIG. 30, for the air-fuel ratio sensor 23, it is described that when the time t1 is shorter than the predetermined reference time Mt, the air-fuel ratio sensor 23 is normal, while for the temperature sensor 24, when the time tP is shorter than the predetermined reference time MP, the temperature sensor 24 is normal. Further, the table of FIG. 30 describes judgments which are determined in accordance with if the air-fuel ratio sensor 23 is normal and if the temperature sensor 24 is normal. That is, in the table of FIG. 30, if the air-fuel ratio sensor 23 is normal and the temperature sensor 24 is normal, it is judged that deposition of particulate does not cause clogging. On the other hand, in the table of FIG. 30, if t1>Mt for the output of true air-fuel ratio sensor 23 and the temperature sensor 24 is normal, it is judged that the air-fuel ratio sensor 23 is abnormal, while in the table of FIG. 30, if the air-fuel ratio sensor 23 is normal and tP>MP for the output of the temperature sensor 24, it is judged that the exhaust purification catalyst 13 is deteriorating.

On the other hand, in the table of FIG. 30, if t1>Mt for the output of the air-fuel ratio sensor 23 and tP>MP for the output of the temperature sensor 24, it is tentatively judged that the deposition of the particulate causes clogging. That is, when t1>Mt for the output of the air-fuel ratio sensor 23 and tP>MP for the output of the temperature sensor 24, sometimes the air-fuel ratio sensor 23 is abnormal and the exhaust purification catalyst 13 has deteriorated, but abnormality of the air-fuel ratio sensor 23 and deterioration of the exhaust purification catalyst 13 should seldom simultaneously occur. Therefore, when t1>Mt for the output of the air-fuel retro sensor 23 and tP>MP for the output of the temperature sensor 24, as explained above, it is tentatively judged that the deposition of the particulate causes clogging.

However, when t1>Mt for the output of the air-fuel ratio sensor 23 and tP>MP for the output of the temperature sensor 24, sometimes the air-fuel ratio sensor 23 is abnormal and the exhaust purification catalyst 13 deteriorates. Therefore, in the embodiment according to the present invention, at this time, regeneration processing for removing the deposited particulate is performed and it is checked if particulate has actually deposited. That is, when particulate has actually deposited, the air-fuel ratio sensor 23 becomes normal and the temperature sensor 24 becomes normal after regeneration processing is performed. Therefore, after the regeneration processing is performed, when the air-fuel ratio sensor 23 becomes normal and the temperature sensor 24 becomes normal, deposition of particulate had actually caused clogging. Therefore, in this embodiment according to the present invention, at this time, it is decided that deposition of particulate actually causes clogging.

Figure 31:
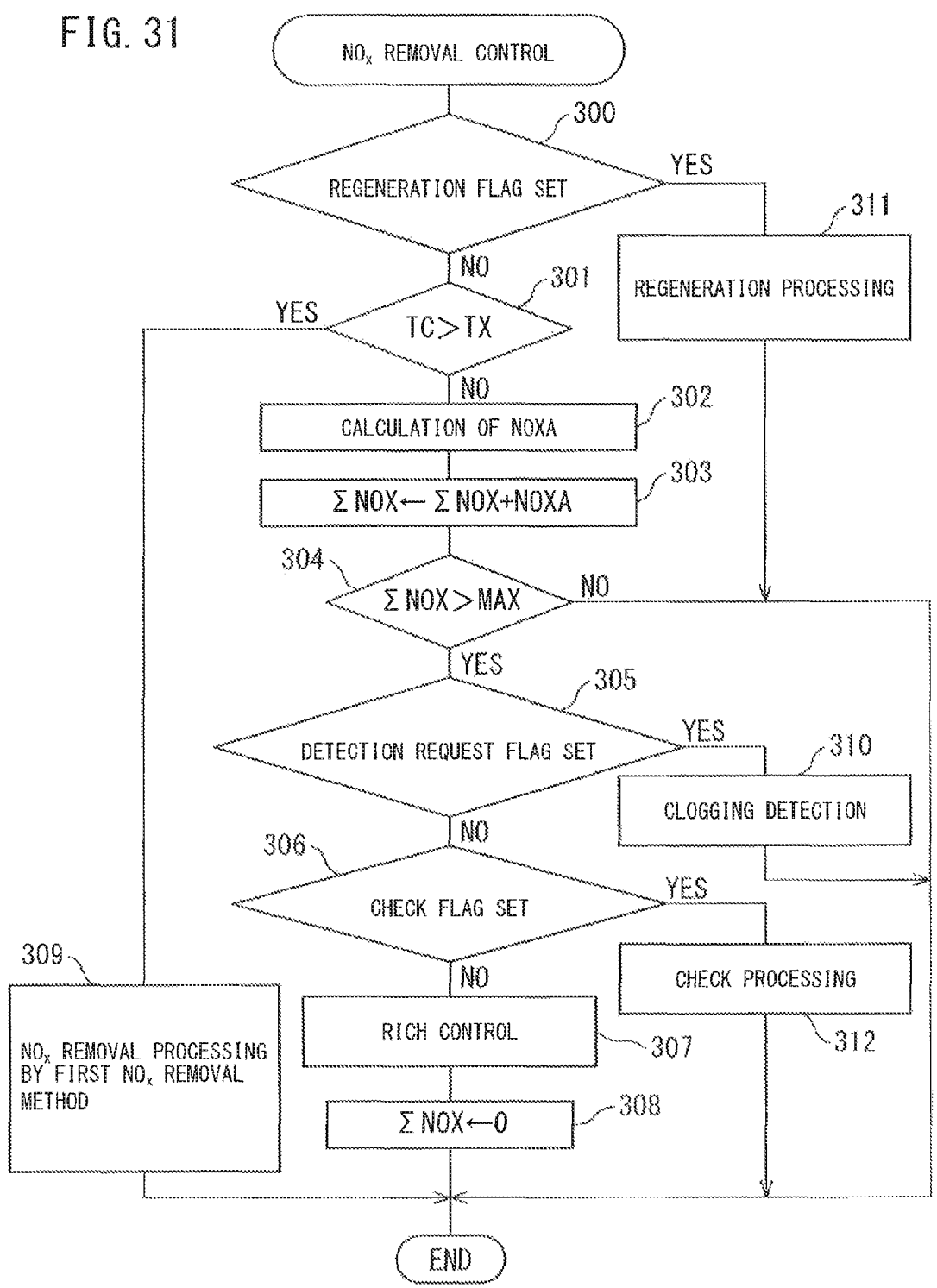
FIG. 31 is a flow chart for performing an $NO_X$ removal control.

Next, still another $NO_x$ removal control method which is designed to use both the air-fuel ratio sensor 23 and temperature sensor 24 to judge whether deposition of particulate causes clogging at the particulate deposition region CL of the upstream side end face of the exhaust purification catalyst 13 will be explained. Note that, in this still other $NO_x$ removal control method as well, it is judged whether deposition of particulate in the exhaust gas causes clogging at the particulate deposition region CL at the peripheral portion of the upstream side end face of the exhaust purification catalyst 13 when the air-fuel ratio of the exhaust gas which flows into the exhaust purification catalyst 13 is made rich to release $NO_x$ from the exhaust purification catalyst 13. FIG. 31 shoes the $NO_x$ removal control routine for working this $NO_x$ removal control method. This routine is executed by interruption every fixed time interval.

Referring to FIG. 31, first, at step 300, it is judged if the regeneration flag for removing the deposited particulate is set. When it is judged that the regeneration flag is not set, the routine proceeds to step 301 where it is judged if temperature TC of the exhaust purification, catalyst 13 which is estimated from the output value of the temperature sensor 24 is higher than the set temperature TX shown in FIG. 9. When it is judged that the temperature TC of the exhaust purification catalyst 13 is lower than the set temperature TX shown in FIG. 9, it is judged that an $NO_x$ removal action by the second $NO_x$ removal method with a higher $NO_x$ removal rate should be performed, then the routine proceeds to step 302 where the $NO_x$ removal action by the second $NO_x$ removal method is performed.

That is, at step 302, the exhaust $NO_x$ amount NOXA per unit time is calculated from the map which is shown in FIG. 13. Next, at step 303, the exhaust $NO_x$ amount NOXA is added to the $\Sigma NOX$ whereby the stored $NO_x$ amount $\Sigma NOX$ is calculated. Next, at step 304, it is judged if the stored $NO_x$ amount $\Sigma NOX$ exceeds the allowable value MAX. When $\Sigma NOX>MAX$, the routine proceeds to step 303 where it is judged if the detection request flag for detecting deposition of particulate causing clogging is set. This detection request flag is set in the detection request judgment routine which is shown in the already explained FIG. 22. When at step 305 it is judged that the detection request flag is not set, the routine proceeds to step 306 where it is judged if a check flag for checking whether deposition of particulate actually cause clogging is set. When, it is judged that the check flag is not set, the routine proceeds to step 307 where the amount of additional fuel WR is calculated from the map which is shown in FIG. 15 and the action for injecting additional fuel is performed. At this time, the air-fuel ratio (A/F) in of the exhaust gas which flows into the exhaust purification catalyst 13 is made rich. Next, at step 308, $\Sigma NOX$ is cleared.

On the other hand, when at step 301 it is judged if the temperature TC of the exhaust purification catalyst 13 is higher than the set temperature TX which is shown in FIG. 9, the routine proceeds to step 309 where the $NO_x$ removal processing by the first $NO_x$ removal method with the higher $NO_x$ removal rate is performed. At this time, hydrocarbons are injected from the hydrocarbon feed valve 15 in an injection amount WT shown in FIG. 11 by an injection period $\Delta T$ which is predetermined corresponding to the engine operating state. In this way, in this embodiment as well, a first NOX removal method which removes NOX contained in exhaust gas by injecting hydrocarbons from the hydrocarbon feed valve within the predetermined range of period and a second NOX removal method which releases stored $NO_X$ from the exhaust purification catalyst 13 to remove $NO_X$ by making the air-fuel ratio of the exhaust gas flowing into the exhaust purification catalyst 13 rich by a period longer than the predetermined range of period are selectively used.

Figure 32:
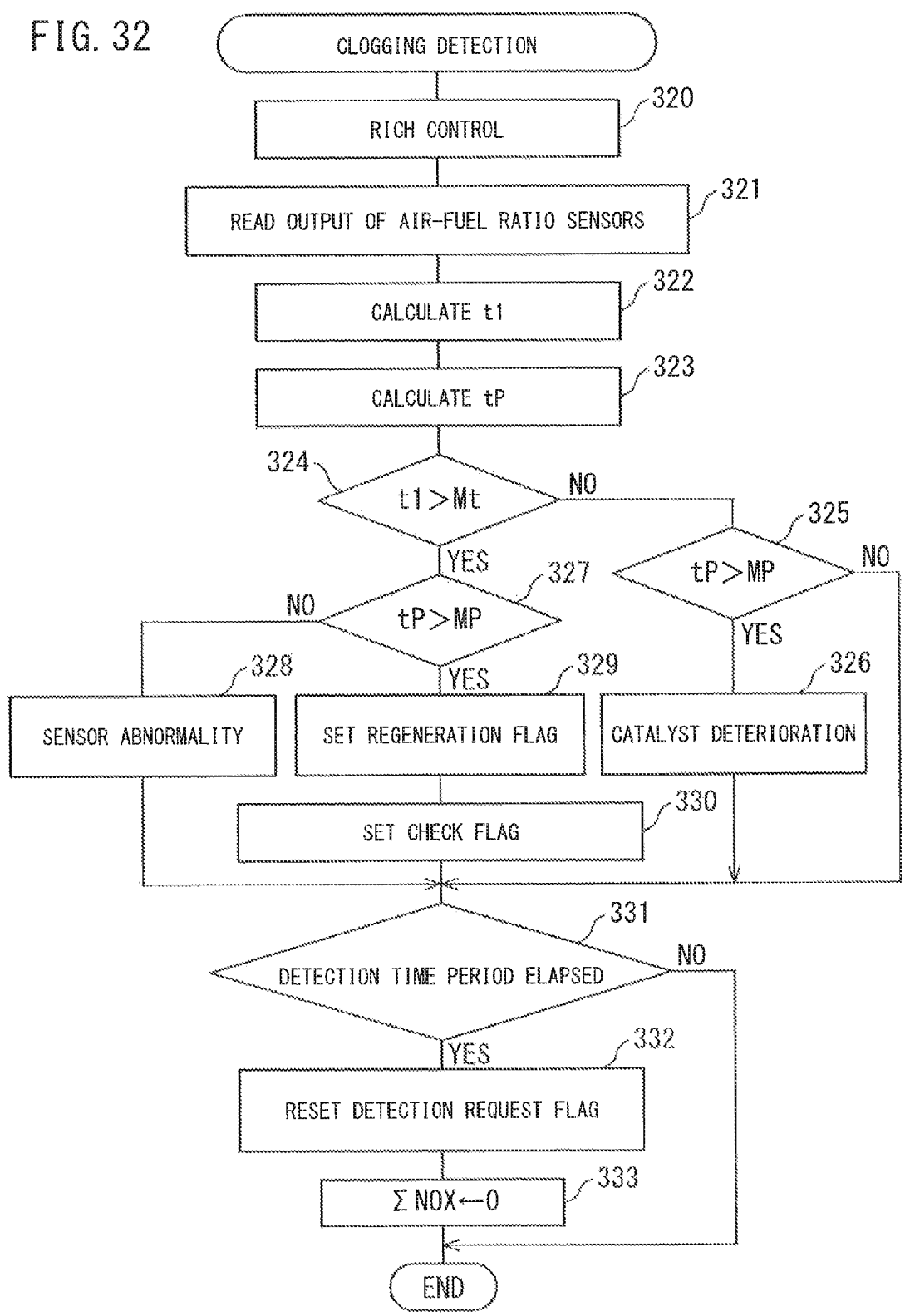
FIG. 32 is a flow chart for detecting a clogging.
Figure 33:
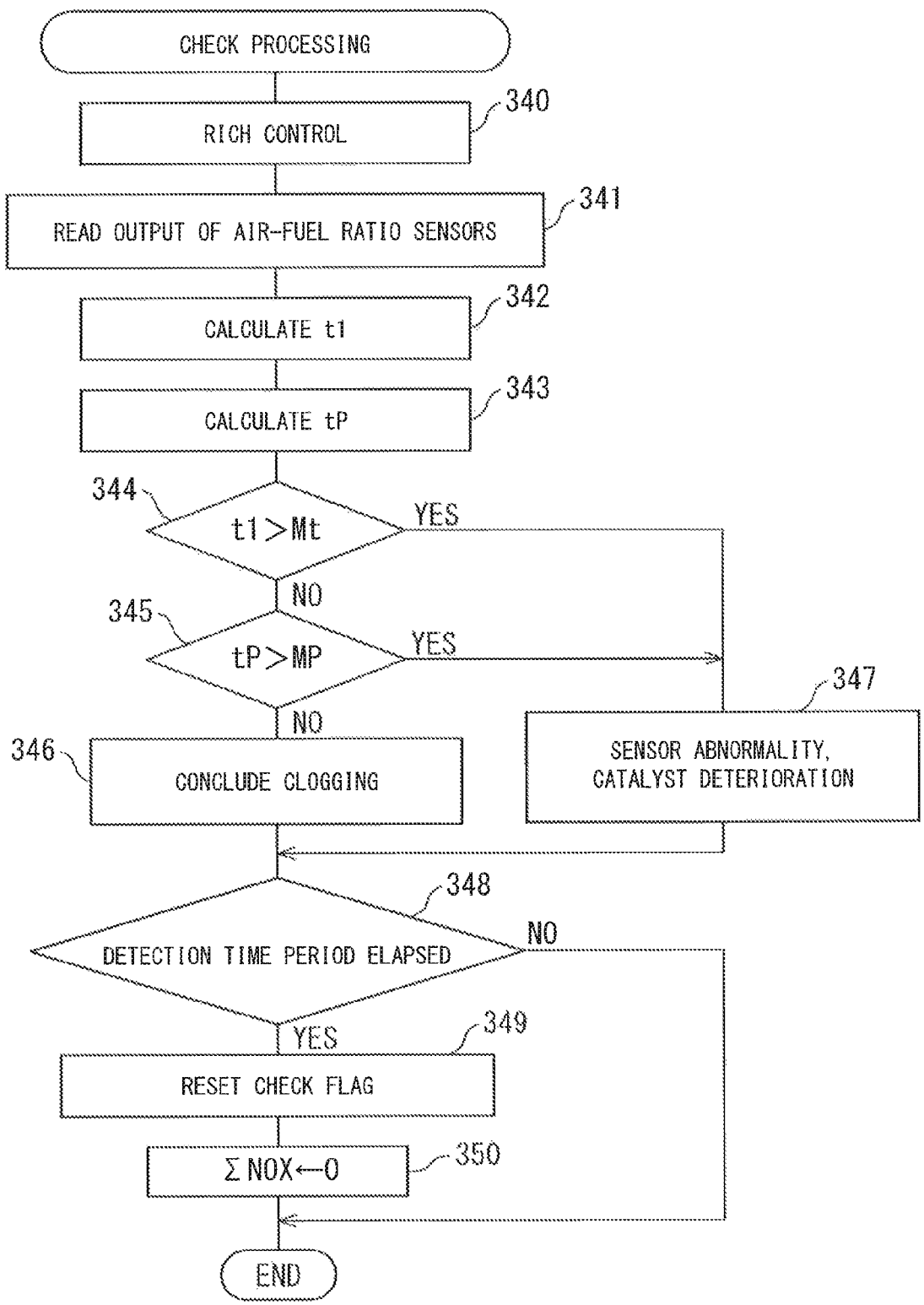
FIG. 33 is a flow chart for performing a check proceeding.

On the other hand, when at step 305 it is judged that the detection request flag is set, the routine proceeds to step 310 where a clogging detection routine for detecting if deposition of particulate causes clogging is performed. This clogging detection routine is shown in FIG. 32. In this clogging detection routine, when it is judged that deposition of particulate causes clogging, the regeneration flag for removal of the deposited particulate is set and the check flag is set. If the regeneration flag is set, the routine proceeds from step 300 to step 311 where regeneration processing for removing the deposited particulate is performed. The regeneration processing routine for this regeneration processing is shown in the already explained FIG. 24. If the regeneration processing is completed, the regeneration flag is reset. At this time, the check flag is set, so if the regeneration flag is reset, the routine proceeds from step 306 to step 312 where check processing for checking if particulate has actually deposited is performed. The check processing routine for performing this check processing is shown in FIG. 33.

FIG. 32 shows a clogging detection routine which is executed at step 310 when it is judged at step 303 of FIG. 31 that the detection request flag is set. Referring to FIG. 32, first, at step 320, rich control for making the air-fuel ratio of the exhaust gas which flows into the exhaust purification catalyst 13 rich is performed. That is, the additional, amount of fuel WR is calculated from the map which is shown in FIG. 15 and the action of injection of additional fuel is performed. At this time, the air-fuel ratio (A/F) in of the exhaust gas which flows into the exhaust purification catalyst 13 is made rich. Next, at step 321, the output voltage V of the air-fuel ratio sensor 23 and the output voltage EX of the temperature sensor 24 are read. Next, at step 322, the time t1 which is required for the output voltage VX of the air-fuel ratio sensor 23 to change from $V_1$ to VS in FIG. 25 is calculated. Next, at step 323, the time tP until the output voltage EX of the temperature sensor 24 reaches a peak at FIG. 29 is calculated.

Next, at step 324, it is judged if the time t1 exceeds the predetermined reference time Mt. When it is judged that the time t1 exceeds the predetermined reference time Mt, the routine proceeds to step 325 where it is judged if the time tP exceeds the predetermined reference time Mp. When it is judged that the time tP does not exceeds the predetermined reference time Mt, it is judged that deposition of particulate does not cause clogging. At this time, the routine jumps to step 331. As opposed to this, when at step 325 it is judged that the time tP exceeds the predetermined reference time MP, the routine proceeds to step 326 where it is judged that the exhaust purification catalyst 13 is deteriorating.

On the other hand, when at step 324 it is judged that the time t1 exceeds the predetermined reference time Mt, the routine proceeds to step 327 where it is judged if the time tP exceeds the predetermined reference time MP. When it is judged that the time tP does not exceed the predetermined reference time MP, the routine proceeds to step 328 where it is judged that the air-fuel ratio sensor 23 is abnormal. As opposed to this, when at step 327 it is judged that the time tP exceeds the predetermined reference time MP, it is judged that deposition of particulate causes clogging, then the routine proceeds to step 329 where the regeneration flag for removing the deposited particulate is set. Next, at step 330, the check flag is set. Next, the routine proceeds to step 331. At step 331, it is judged whether a predetermined defection time period for detecting whether deposition of particulate causes clogging has elapsed or not. When the predetermined detection time period has elapsed, the routine proceeds from step 331 to step 332 where the detection request flag is reset. Next, at step 333, $\Sigma NOX$ is cleared.

FIG. 33 shows the check processing routine which is executed at step 312 when it is judged at step 306 of FIG. 31 that the check flag is set. Referring to FIG. 33, first, at step 340, rich control for making the air-fuel ratio of the exhaust gas which flows into the exhaust purification catalyst 13 rich is performed. That is, the amount of additional fuel WR is calculated from the map which is shown in FIG. 15, and the action of injection of additional fuel is performed. At this time, the air-fuel ratio (A/F) in of the exhaust gas which flows into the exhaust purification catalyst 13 is made rich. Next, at step 341, the output voltage V of the air-fuel ratio sensor 23 and the output voltage EX of the temperature sensor 24 are read. Next, at step 342, the time t1 which is required for the output voltage VX of the air-fuel ratio sensor 23 to change from $V_1$ to VS in FIG. 25 is calculated. Next, at step 343, the time tP until the output voltage EX of the temperature ratio sensor 24 reaches the peek is calculated.

Next, at step 344, it is judged if the time t1 exceeds the predetermined reference time Mt. When it is judged that the time t1 does not exceed the predetermined reference time Mt, the routine proceeds to step 345 where it is judged if the time tP exceeds the predetermined reference time MP. When it is judged that the time tP does not exceed the predetermined reference time Mt, the routine proceeds to step 346 where it is determined that deposition of particulate actually causes clogging. Next, the routine proceeds to step 318. As opposed to this, when at step 344 it is judged that the time t1 exceeds the predetermined reference time Mt or when at step 345 it is judged that the time tP exceeds the predetermined reference time MP, the routine proceeds to step 347 where it is judged that the air-fuel ratio sensor 23 is abnormal and the exhaust purification catalyst 13 as deteriorating. Next, the routine proceeds to step 348.

At step 348, it is judged if the predetermined check time for checking if deposition of particulate actually causes clogging has elapsed. When the predetermined check time has elapsed, the routine proceeds from step 348 to step 349 where the check flag is reset. Next, at step 350, ΣNOX is cleared.

In this way, in this embodiment, the temperature sensor 24 is arranged downstream of the peripheral portion of the downstream side end face of the exhaust purification catalyst 13 in the exhaust gas flow region corresponding to the downstream side of the particulate deposition region CL when viewed along the longitudinal axis of the exhaust purification catalyst 13. When the air-fuel ratio of the exhaust gas which flows into the exhaust purification catalyst 13 is made rich to release $NO_x$ from the exhaust purification catalyst 13, it is judged that deposition of particulate in the exhaust gas causes clogging in the particulate deposition region CL at the part around the upstream side end face of the exhaust purification catalyst 13 when the speed of change of the output value of the air-fuel ratio sensor 24 falls and the time of change of the temperature of the exhaust gas which is detected by the temperature sensor 24 increases.

Further, in this embodiment, when it is judged that deposition of particulate in the exhaust gas causes clogging at the particulate deposition region CL at the part around the upstream side end face of the exhaust purification catalyst 13, when the air-fuel ratio of the exhaust gas which flows into the exhaust purification catalyst 13 is next made rich to release $NO_x$ from the exhaust purification, catalyst 13, it is again judged whether deposition of particulate in the exhaust gas causes clogging at the particulate deposition region CL at the peripheral portion of the upstream side end face of the exhaust purification catalyst 13. At this time, if the speed of change of the output value of the air-fuel ratio sensor 23 increases and the time of change of the temperature of the exhaust gas which is detected by the temperature sensor 24 decreases, it is conclusively determined that deposition of particulate in the exhaust gas causes clogging at the particulate deposition region CL at the peripheral portion of the upstream side end face of the exhaust purification catalyst 13.

Note that, as another embodiment, it is also possible to arrange an oxidation catalyst for reforming hydrocarbons in the engine exhaust passage upstream of the exhaust purification catalyst 13.

REFERENCE SIGNS LIST

4 intake manifold
5 exhaust manifold
7 exhaust turbocharger
12*a*, 12*b* exhaust pipe
13 exhaust purification catalyst
14 particulate filter
15 hydrocarbon feed valve

The invention claimed is:

1. An abnormality detection system of an internal combustion engine comprising:
   an exhaust purification catalyst arranged in an engine exhaust passage;
   a hydrocarbon feed valve arranged in the engine exhaust passage upstream of the exhaust purification catalyst,
   wherein the exhaust purification catalyst comprises:
      a straight flow type catalyst having a plurality of exhaust flow paths which extend in a longitudinal axial direction of the exhaust purification catalyst, and
      a limited partial region, predicted in advance as a particulate deposition region, where deposition of particulate in the exhaust gas may cause clogging at a peripheral portion of an upstream side end face of the exhaust purification catalyst;
   an air-fuel ratio sensor arranged downstream of a peripheral portion of a downstream side end face of the exhaust purification catalyst in an exhaust gas flow region corresponding to the downstream side of the particulate deposition region when viewed along a longitudinal axis of the exhaust purification catalyst,
   wherein when an air-fuel ratio of an exhaust gas flowing into the exhaust purification catalyst is made to instantaneously change, if deposition of particulate in the exhaust gas causes clogging at the particulate deposition region in the peripheral portion of the upstream side end face of the exhaust purification catalyst, a speed of change of an output value of the air-fuel ratio sensor falls compared with when deposition of the particulate does not cause clogging; and
   an electronic control unit configured to determine whether deposition of particulate in the exhaust gas causes dogging at the particulate deposition region in the peripheral portion of the upstream side end face of the exhaust purification catalyst when the air-fuel ratio of the exhaust gas flowing into the exhaust purification catalyst is made to instantaneously change,
      wherein the electronic control unit is further configured determine that deposition of particulate in the exhaust gas causes clogging at the particulate deposition region in the peripheral portion of the upstream side end face of the exhaust purification catalyst when the speed of change of the output value of the air-fuel ratio sensor falls at this time.

2. The abnormality detection system of an internal combustion engine as claimed in claim 1, wherein the particulate deposition region in the peripheral portion of the upstream side end face of the exhaust purification catalyst is found in advance and the air-fuel ratio sensor is arranged in an exhaust gas flow region which corresponds to the downstream side of the particulate deposition region found in advance when viewed along the longitudinal axis of the exhaust purification catalyst.

3. The abnormality detection system of an internal combustion engine as claimed in claim 2, wherein:
   a precious metal catalyst is carried on an exhaust gas flow surface of the exhaust purification catalyst,
   basic exhaust gas flow surface parts are formed around the precious metal catalyst, and when the air-fuel ratio of the exhaust gas flowing into the exhaust purification catalyst is made rich to release $NO_x$ from the exhaust purification catalyst, the electronic control unit is configured to determine whether deposition of particulate in the exhaust gas causes clogging at the particulate deposition region in the peripheral portion of the upstream side end face of the exhaust purification catalyst.

4. The abnormality detection system of an internal combustion engine as claimed in claim 3, wherein:
the exhaust purification catalyst has a property of reducing $NO_X$ which is contained in the exhaust gas when a concentration of hydrocarbons which flow into the exhaust purification catalyst vibrate within a predetermined range of amplitude and within a predetermined range of period,
the exhaust purification catalyst has a property of being increased in storage amount of $NO_X$ which is contained in the exhaust gas when a vibration period of the hydrocarbon concentration is longer than the predetermined range, and
the electronic control unit is configured to selectively conduct a first $NO_X$ removal method, which removes $NO_X$ contained in exhaust gas by injecting hydrocarbons from the hydrocarbon feed valve within the predetermined range of period, and a second $NO_X$ removal method, which releases stored $NO_X$ from the exhaust purification catalyst to remove $NO_X$ by making the air-fuel ratio of the exhaust gas flowing into the exhaust purification catalyst rich by a period longer than the predetermined range of period.

5. The abnormality detection system of an internal combustion engine as claimed in claim 3, wherein:
the exhaust purification catalyst has an oxygen storage ability, and
the electronic control unit is configured to determine, when the air-fuel ratio of the exhaust gas flowing into the exhaust purification catalyst is made rich to release $NO_x$ from the exhaust purification catalyst, if the speed of change of the output value of the air-fuel ratio sensor falls and the time during which the air-fuel ratio detected by the air-fuel ratio sensor is maintained at the stoichiometric air-fuel ratio increases, that deposition of particulate in the exhaust gas causes clogging at the particulate deposition region in the peripheral portion of the upstream side end face of the exhaust purification catalyst.

6. The abnormality detection system of an internal combustion engine as claimed in claim 3, wherein:
a temperature sensor is arranged downstream of the peripheral portion of the downstream side end face of the exhaust purification catalyst in the exhaust gas flow region corresponding to the downstream side of the particulate deposition region when viewed along the longitudinal axis of the exhaust purification catalyst, and
the electronic control unit is configured to determine, when the air-fuel ratio of the exhaust gas flowing into the exhaust purification catalyst is made rich to release $NO_x$ from the exhaust purification catalyst, if the speed of change of the output value of the air-fuel ratio sensor falls and a time of change of a temperature of the exhaust gas which is detected by the temperature sensor increases, that deposition of particulate in the exhaust gas causes clogging at the particulate deposition region in the peripheral portion of the upstream side end face of the exhaust purification catalyst.

7. The abnormality detection system of an internal combustion engine as claimed in claim 6, wherein when the electronic control unit determines that deposition of particulate in the exhaust gas causes clogging at the particulate deposition region in the peripheral portion of the upstream side end face of the exhaust purification catalyst, and when the air-fuel ratio of the exhaust gas flowing into the exhaust purification catalyst is next made rich to release $NO_x$ from the exhaust purification catalyst, the electronic control unit is further configured to determine whether deposition of particulate in the exhaust gas causes clogging at the particulate deposition region in the peripheral portion of the upstream side end face of the exhaust purification catalyst, and
wherein if, at this time, the speed of change of the output value of the air-fuel ratio sensor is increased and the time of change of the temperature of the exhaust gas which is detected by the temperature sensor is decreased, the electronic control unit is configured to determine that deposition of particulate in the exhaust gas causes clogging at the particulate deposition region in the peripheral portion of the upstream side end face of the exhaust purification catalyst.

8. The abnormality detection system of an internal combustion engine as claimed in claim 3, wherein, the electronic control unit is configured to feed additional fuel into a combustion chamber to make the air-fuel ratio of the exhaust gas, which is exhausted from the combustion chamber, rich when making the air-fuel ratio of the exhaust as flowing into the exhaust purification catalyst rich to release $NO_x$ from the exhaust purification catalyst.

9. The abnormality detection system of an internal combustion engine as claimed in claim 1, wherein when the electronic control unit determines that deposition of particulate in the exhaust gas causes clogging at the particulate deposition region in the peripheral portion of the upstream side end face of the exhaust purification catalyst, the electronic control unit is configured to perform temperature raising control of the upstream side end face of the exhaust purification catalyst to remove the deposited particulate.

10. The abnormality detection system of an internal combustion engine as claimed in claim 1, wherein the electronic control unit is configured to determine whether the speed of change of the output value of the air-fuel ratio sensor falls, when the air-fuel ratio of the exhaust gas flowing into the exhaust purification catalyst is made to instantaneously change, based on any of:
the time which is required for a fall of output voltage of the air-fuel ratio sensor,
the speed of fall of the output voltage of the air-fuel ratio sensor,
the time which is required for a rise of output voltage of the air-fuel ratio sensor, and
the speed of rise of the output voltage of the air-fuel ratio sensor.

* * * * *